(12) United States Patent
Nishikawa et al.

(10) Patent No.: US 12,250,471 B2
(45) Date of Patent: Mar. 11, 2025

(54) IMAGING ELEMENT, IMAGING METHOD, AND IMAGING DEVICE

(71) Applicant: Sony Group Corporation, Tokyo (JP)

(72) Inventors: Jun Nishikawa, Tokyo (JP); Hiroshi Sumihiro, Kanagawa (JP); Takeo Ohishi, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 72 days.

(21) Appl. No.: 18/033,995

(22) PCT Filed: Nov. 19, 2021

(86) PCT No.: PCT/JP2021/042701
§ 371 (c)(1),
(2) Date: Apr. 26, 2023

(87) PCT Pub. No.: WO2022/113917
PCT Pub. Date: Jun. 2, 2022

(65) Prior Publication Data
US 2024/0007754 A1    Jan. 4, 2024

(30) Foreign Application Priority Data

Nov. 27, 2020 (JP) ................................ 2020-197604

(51) Int. Cl.
*H04N 23/74*    (2023.01)
*G06V 10/60*    (2022.01)
*H04N 23/73*    (2023.01)

(52) U.S. Cl.
CPC ............. *H04N 23/74* (2023.01); *G06V 10/60* (2022.01); *H04N 23/73* (2023.01)

(58) Field of Classification Search
CPC ...... H04N 23/74; H04N 23/73; H04N 25/583; H04N 23/741; H04N 25/58; H04N 25/589; H04N 25/78; G06V 10/60; G06V 10/147

USPC .......................................................... 348/362
See application file for complete search history.

(56) References Cited

U.S. PATENT DOCUMENTS

| 2014/0267828 A1* | 9/2014 | Kasai | H04N 23/741 |
| | | | 348/229.1 |
| 2020/0176493 A1* | 6/2020 | Ikeda | H04N 25/673 |

FOREIGN PATENT DOCUMENTS

| JP | 2013021660 A | 1/2013 |
| JP | 2014235521 A | 12/2014 |
| JP | 2016039614 A | 3/2016 |

(Continued)

OTHER PUBLICATIONS

International Search Report (PCT/ISA/210), International Application No. PCT/JP2021/042701, dated Feb. 1, 2022.

*Primary Examiner* — Lin Ye
*Assistant Examiner* — Chan T Nguyen
(74) *Attorney, Agent, or Firm* — Michael Best & Friedrich LLP

(57) ABSTRACT

An imaging element, an imaging method, and an imaging device capable of acquiring a pixel signal of a high dynamic range without losing an information amount are provided. An imaging element according to an embodiment includes an imaging unit (100 or 101) and a generation unit (102). The imaging unit includes a unit pixel that outputs a pixel signal corresponding to received light. The generation unit generates, on the basis of the pixel signal, a processing pixel signal corresponding to each of a plurality of luminance regions having continuous luminance.

16 Claims, 15 Drawing Sheets

(56) References Cited

FOREIGN PATENT DOCUMENTS

JP 2018097897 * 6/2018

* cited by examiner

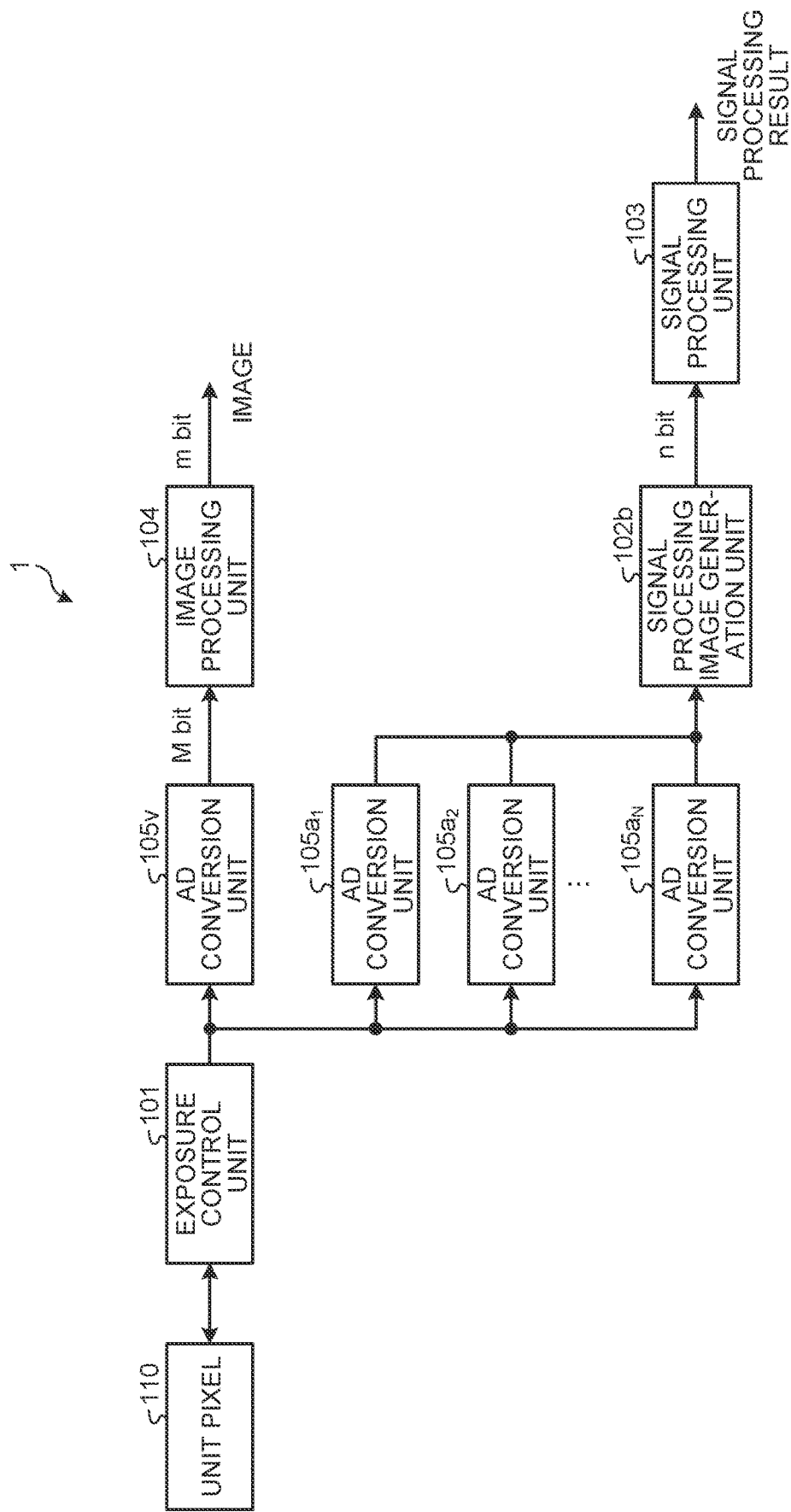

IMAGING ELEMENT, IMAGING METHOD, AND IMAGING DEVICE

FIELD

The present disclosure relates to an imaging element, an imaging method, and an imaging device.

BACKGROUND

A technology of generating a wide dynamic range image on the basis of a captured image acquired by single imaging has been known. For example, Patent Literature 1 discloses a technology of combining a pixel signal of a low sensitivity pixel having low sensitivity to light and a pixel signal of a high sensitivity pixel having high sensitivity. According to Patent Literature 1, it is possible to acquire a pixel signal having a wider dynamic range by combining the pixel signal of the low sensitivity pixel and the pixel signal of the high sensitivity pixel.

CITATION LIST

Patent Literature

Patent Literature 1: Japanese Patent Application Laid-Open No. 2013-21660

SUMMARY

Technical Problem

In Patent Literature 1, a bit reduction is performed by a tone conversion of a pixel signal, which is acquired by combination of a pixel signal of a high sensitivity pixel and a pixel signal of a low sensitivity pixel and has many bits, into a pixel signal having a small number of bits, and it is made possible for a signal processing unit such as a digital signal processor (DSP) in a subsequent stage to perform processing thereof. Thus, an information amount of the pixel signal transferred to the signal processing unit is lost for an amount of the bit reduction as compared with the pixel signal acquired by the combination of the pixel signal of the high sensitivity pixel and the pixel signal of the low sensitivity pixel.

An object of the present disclosure is to provide an imaging element, an imaging method, and an imaging device capable of acquiring a pixel signal of a high dynamic range without losing an information amount.

Solution to Problem

For solving the problem described above, an imaging element according to one aspect of the present disclosure has an imaging unit including a unit pixel that outputs a pixel signal corresponding to received light; and a generation unit that generates, on a basis of the pixel signal, a processing pixel signal corresponding to each of a plurality of luminance regions having continuous luminance.

BRIEF DESCRIPTION OF DRAWINGS

FIG. 12 is a functional block diagram of an example for describing a function of an imaging device according to a second embodiment.

DESCRIPTION OF EMBODIMENTS

Figure 1:
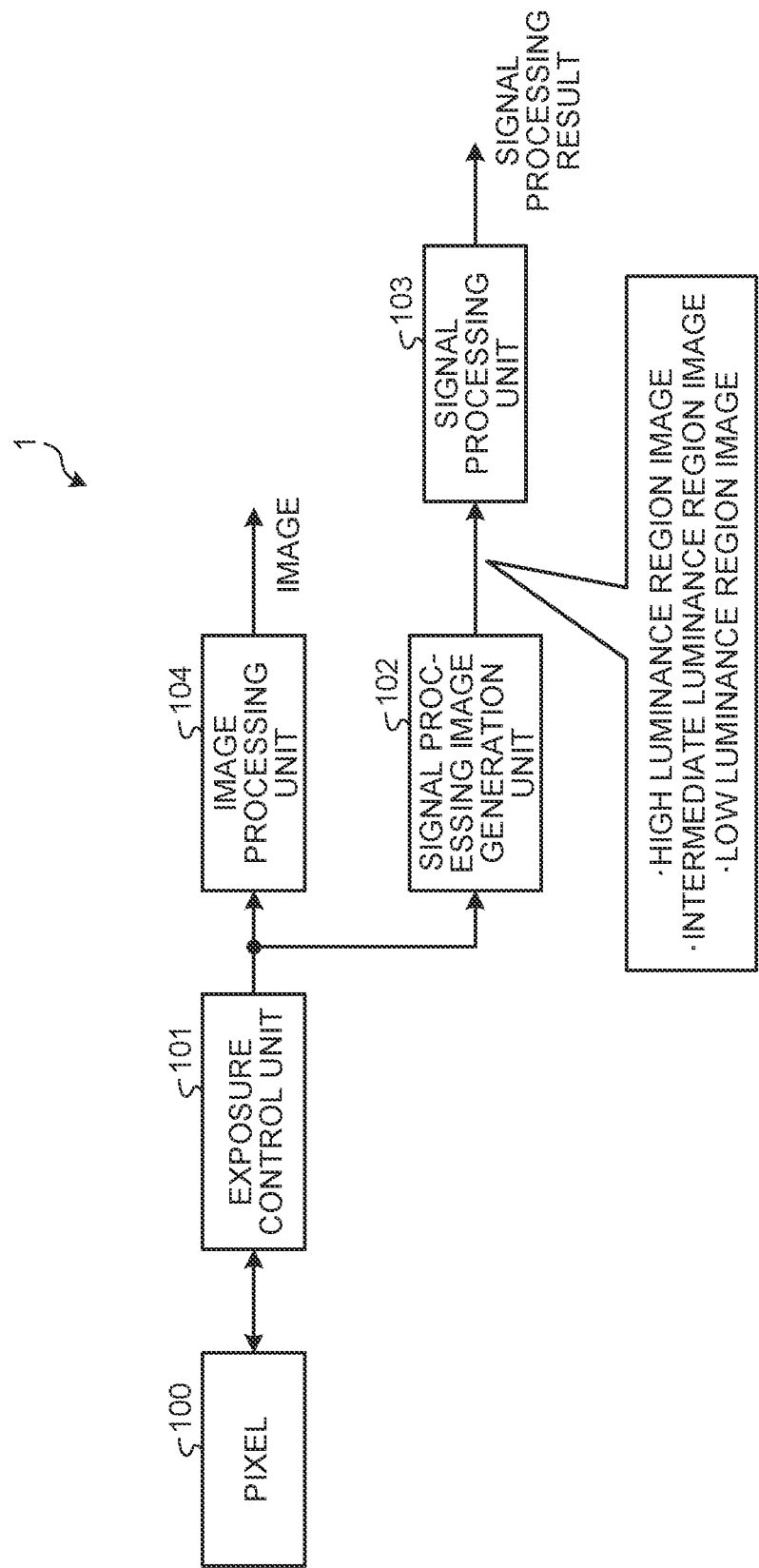
FIG. 1 is a view for schematically describing processing according to each of embodiments of the present disclosure.

In the following, embodiments of the present disclosure will be described in detail on the basis of the drawings. Note that in the following embodiments, overlapped description is omitted by assignment of the same reference sign to identical parts.

Hereinafter, embodiments of the present disclosure will be described in the following order.

1. Outline of the present disclosure
2. Technology applicable to the present disclosure
3. First embodiment of the present disclosure
    3-1. Configuration according to the first embodiment
    3-2. Processing according to the first embodiment
4. Second embodiment of the present disclosure
    4-1. Configuration according to the second embodiment
    4-2. Processing according to the second embodiment 5. Third embodiment of the present disclosure
   5-1. Configuration according to the third embodiment
   5-2. Processing according to the third embodiment
6. Fourth embodiment of the present disclosure

1. Outline of the Present Disclosure

Each embodiment of the present disclosure relates to an imaging element that images a subject and acquires a captured image, and the imaging element according to the present disclosure generates a plurality of images respectively corresponding to a plurality of luminance regions having continuous luminance values on the basis of the captured image and passes the generated plurality of images to a signal processing unit that performs predetermined signal processing.

FIG. 1 is a view for schematically describing processing according to each of embodiments of the present disclosure. In FIG. 1, an imaging device 1 includes a pixel 100, an exposure control unit 101, a signal processing image generation unit 102, a signal processing unit 103, and an image processing unit 104. The pixel 100 is actually a pixel array in which pixels are arranged in a matrix array. In FIG. 1, one pixel 100 among the plurality of pixels included in the pixel array is focused on and illustrated.

In FIG. 1, the pixel 100 performs exposure under the control of the exposure control unit 101, and outputs a pixel signal corresponding to luminance of light received by the exposure. The pixel signal is supplied to the signal processing image generation unit 102 and the image processing unit 104 via the exposure control unit 101. For example, the image processing unit 104 performs image processing for display, such as white balance adjustment processing and gamma correction processing on an image signal by the supplied pixel signal for one frame, and outputs the image signal. Mainly for the display, the image signal output from the image processing unit 104 is used, for example, for display on a display, recording in a recording medium, an output to the outside, and the like.

On the basis of the pixel signal supplied from the pixel 100, the signal processing image generation unit 102 generates a plurality of pixel signals corresponding to each of a plurality of luminance regions having continuous luminance values. The plurality of pixel signals is processing signals for processing by the signal processing unit 103 (described later). For example, the signal processing image generation unit 102 generates a pixel signal of a luminance component of a high luminance region, a pixel signal of a luminance component of an intermediate luminance region, and a pixel signal of a luminance component of a low luminance region on the basis of the pixel signals.

Here, the high luminance region is, for example, a luminance region from maximum luminance to first luminance. The intermediate luminance region is, for example, a luminance region from the first luminance to second luminance lower than the first luminance. In addition, the low luminance region is, for example, a luminance region from the second luminance to minimum luminance (such as luminance value=0).

Note that unless otherwise specified, hereinafter, the pixel signal of the luminance component of the high luminance region is referred to as a high luminance region pixel signal, and an image of the high luminance region pixel signal is referred to as a high luminance region image. Similarly, the pixel signal and the image of the luminance component of the intermediate luminance region are respectively referred to as an intermediate luminance region pixel signal and an intermediate luminance region image, and the pixel signal and the image of the luminance component of the low luminance region are respectively referred to as a low luminance region pixel signal and a low luminance region image.

The signal processing image generation unit 102 supplies the generated high luminance region pixel signal, intermediate luminance region pixel signal, and low luminance region pixel signal to the signal processing unit 103.

The signal processing unit 103 performs predetermined signal processing on the high luminance region pixel signal, the intermediate luminance region pixel signal, and the low luminance region pixel signal supplied from the signal processing image generation unit 102. For example, as the signal processing, the signal processing unit 103 executes recognition processing using a neural network. More specifically, the signal processing unit 103 includes a neural network learned by utilization of a predetermined high luminance region pixel signal, intermediate luminance region pixel signal, and low luminance region pixel signal. The signal processing unit 103 performs recognition processing on the high luminance region pixel signal, the intermediate luminance region pixel signal, and the low luminance region pixel signal, which are supplied from the signal processing image generation unit 102, by using the neural network, and outputs a recognition result as a signal processing result.

Here, the signal processing unit 103 generally includes a processor such as a digital signal processor (DSP), and a bit width of data that can be input is often fixed (for example, 8 bits). On the other hand, in a case where a pixel signal output from the pixel 100 is a pixel signal of a high dynamic range, there is a possibility that a bit width of pixel data acquired by conversion of the pixel signal into a digital signal exceeds a bit width that can be input to the signal processing unit 103 (for example, 18 bits).

In such a case, in the existing technology, bit reduction processing is performed on pixel data acquired by conversion of the pixel signal output from the pixel 100, and recognition processing is performed on the basis of the pixel data (image data) on which the bit reduction processing is performed. The loss of information due to the bit reduction processing may affect the result of the recognition processing.

On the other hand, in each of embodiments of the present disclosure, the signal processing image generation unit 102 generates pixel signals, which respectively corresponds to a plurality of luminance regions, on the basis of a pixel signal output from the pixel 100. Thus, pixel data based on the pixel signal can be supplied to the signal processing unit 103 without reduction of a bit width thereof, and a more accurate recognition result can be acquired.

2. Technology Applicable to the Present Disclosure

Next, a technology applicable to each of the embodiments of the present disclosure will be described.
(Configuration Example of an Electronic Device Applicable to Each Embodiment)

Figure 2:
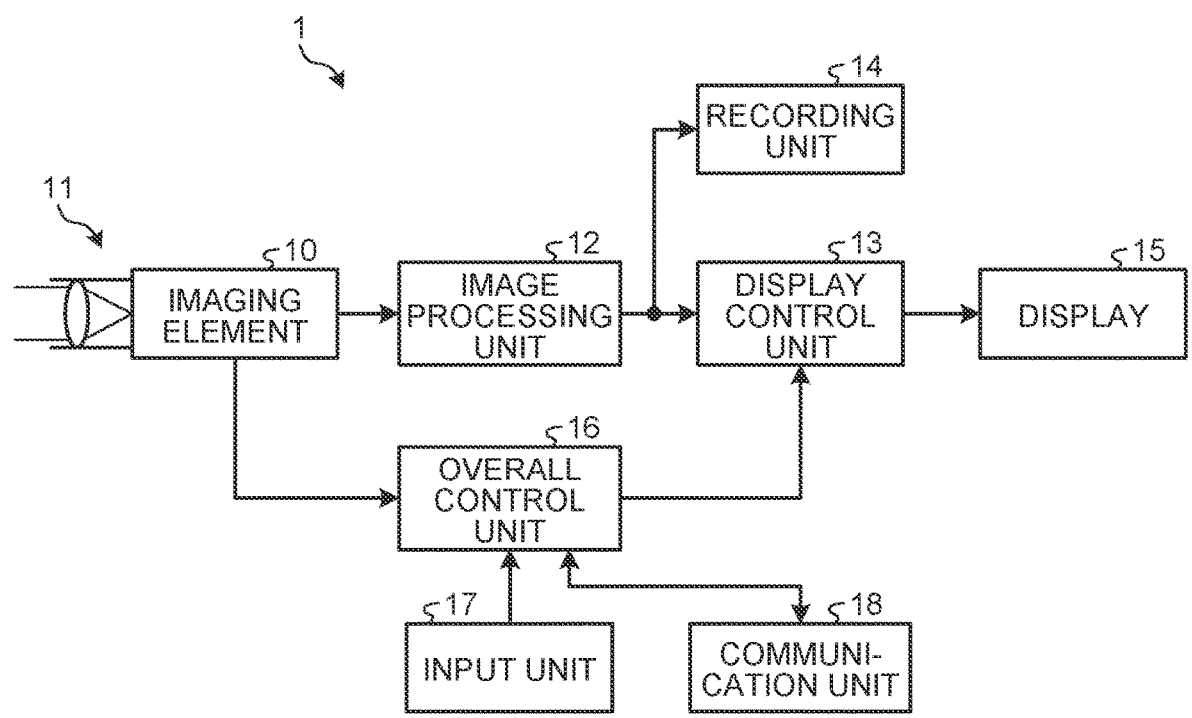
FIG. 2 is a block diagram illustrating a configuration of an example of an imaging device applicable to each of the embodiments of the present disclosure.

FIG. 2 is a block diagram illustrating a configuration of an example of an imaging device applicable to each of the embodiments of the present disclosure. In FIG. 2, the imaging device 1 includes an imaging element 10, an optical unit 11, an image processing unit 12, a display control unit 13, a recording unit 14, a display 15, an overall control unit 16, an input unit 17, and a communication unit 18.

The imaging element 10 includes an imaging unit including a pixel array in which pixels 100 are arranged in a matrix array, generates a pixel signal corresponding to light incident through the optical unit 11, converts the generated pixel signal into pixel data that is a digital signal, and outputs the pixel data. Furthermore, the imaging element 10 has a function of performing recognition processing on the basis of a pixel signal generated by the pixel array.

The pixel data output from the imaging element 10 is supplied to the image processing unit 12. The image processing unit 12 performs image processing for display, such as white balance adjustment processing and gamma correction processing on image mage data by the supplied pixel data for one frame, and outputs the image data. The image data output from the image processing unit 12 is supplied to the display control unit 13. The display control unit 13 controls display of an image based on the supplied image data on the display 15. The image data output from the image processing unit 12 is also supplied to the recording unit 14. The recording unit 14 includes a nonvolatile recording medium such as a hard disk drive or a flash memory, and records the supplied image data in the recording medium. The above is not a limitation, and the image data output from the image processing unit 12 can also be output to the outside of the imaging device 1.

The overall control unit 16 includes, for example, a processor such as a central processing unit (CPU) and controls overall operation of the imaging device 1 according to a program. Furthermore, a recognition result by the recognition processing is supplied to the overall control unit 16 from the imaging element 10. The overall control unit 16 can cause the display control unit 13 to release a display lock on the display 15 according to the supplied recognition result, for example.

The input unit 17 receives a user operation and passes a signal corresponding to the user operation to the overall control unit 16. The overall control unit 16 can control the operation of the imaging device 1 according to the signal passed from the input unit 17. Note that as a so-called touch panel, the input unit 17 may be integrated with the display 15.

The communication unit 18 communicates with an external device by, for example, wireless communication under the control of the overall control unit 16.

(Configuration Example of an Imaging Element Applicable to Each Embodiment)

An optical filter that transmits light in a predetermined wavelength region is provided in each of the pixels 100 included in the pixel array included in the imaging element 10. Unless otherwise specified, the description will be made with the optical filter that transmits light in the predetermined wavelength region being a color filter.

In a case of acquiring full-color image data, generally, three types of color filters that are a color filter that transmits light in a wavelength band of red (R) (R color filter in the following), a color filter that transmits light in a wavelength band of green (G) (G color filter in the following), and a color filter that transmits light in a wavelength band of blue (B) (B color filter in the following) are used. Although various arrays of the R, G, and B color filters can be considered, an array called a Bayer array is generally used.

Figure 3:
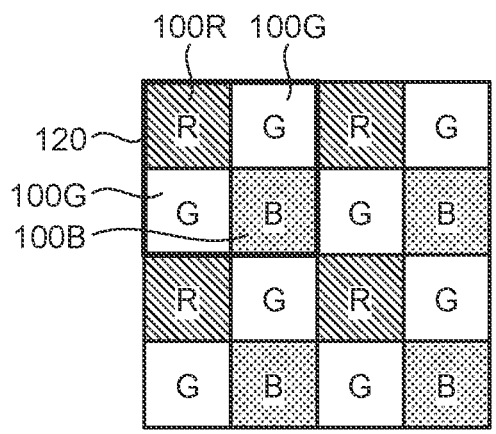
FIG. 3 is a view illustrating an example of a Bayer array.

FIG. 3 is a view illustrating an example of the Bayer array. In FIG. 3, the Bayer array 120 includes two pixels 100G in each of which the G color filter is arranged, one pixel 100R in which the R color filter is arranged, and a pixel 100B in which the B color filter is arranged. In the Bayer array, these four pixels are arrayed in a lattice of two pixels×two pixels in such a manner that the two pixels 100G are not adjacent to each other. In other words, the Bayer array is an array in which pixels 100 in which color filters that transmit light in the same wavelength band are arranged are not adjacent to each other.

Hereinafter, unless otherwise specified, the "pixel 100R in which the R color filter is arranged" is referred to as an "R pixel 100R" or simply as a "pixel 100R". The same applies to the pixel 100G in which the G color filter is arranged and the pixel 100B in which the B color filter is arranged. Furthermore, in a case where the color filter is not specifically an issue, description will be made with a pixel 100 being a representative of each of the pixels 100R, 100G, and 100B.

Figure 4:
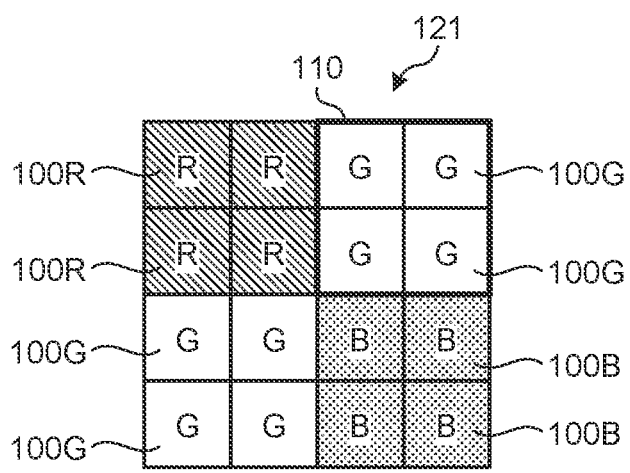
FIG. 4 is a view for describing a unit pixel applicable to each of the embodiments.

FIG. 4 is a view for describing a unit pixel applicable to each of the embodiments. In an array of FIG. 4, a configuration in which four pixels of the same color are arrayed in a matrix of two pixels×two pixels is regarded as one pixel, and is referred to as a unit pixel 110. Unit pixels 110 including the four R pixels 100R, four G pixels 100G, and four B pixels 100B respectively arranged in the array of the matrix of two pixels×two pixels are arranged in a pixel array based on the Bayer array. Hereinafter, unless otherwise specified, such a pixel array is referred to as a quarter-split Bayer RGB array.

More specifically, the quarter-split Bayer RGB array is arrayed in a 2×2 lattice in such a manner that the unit pixels 110 of the R pixels 100R, the G pixel 100G, and the B pixel 100B have a ratio of 1:2:1 in the number of the pixels 100R, the pixels 100G, and the pixels 100B, and that the unit pixels 110 of the same color are not adjacent to each other. In the example of FIG. 3, the unit pixel 110 of the G pixels 100G is arranged on the left and below the unit pixel 110 of the R pixels 100R, and the unit pixel 110 of the B pixels 100B is arranged diagonally to the unit pixel 110 of the R pixels 100R.

Figure 5:
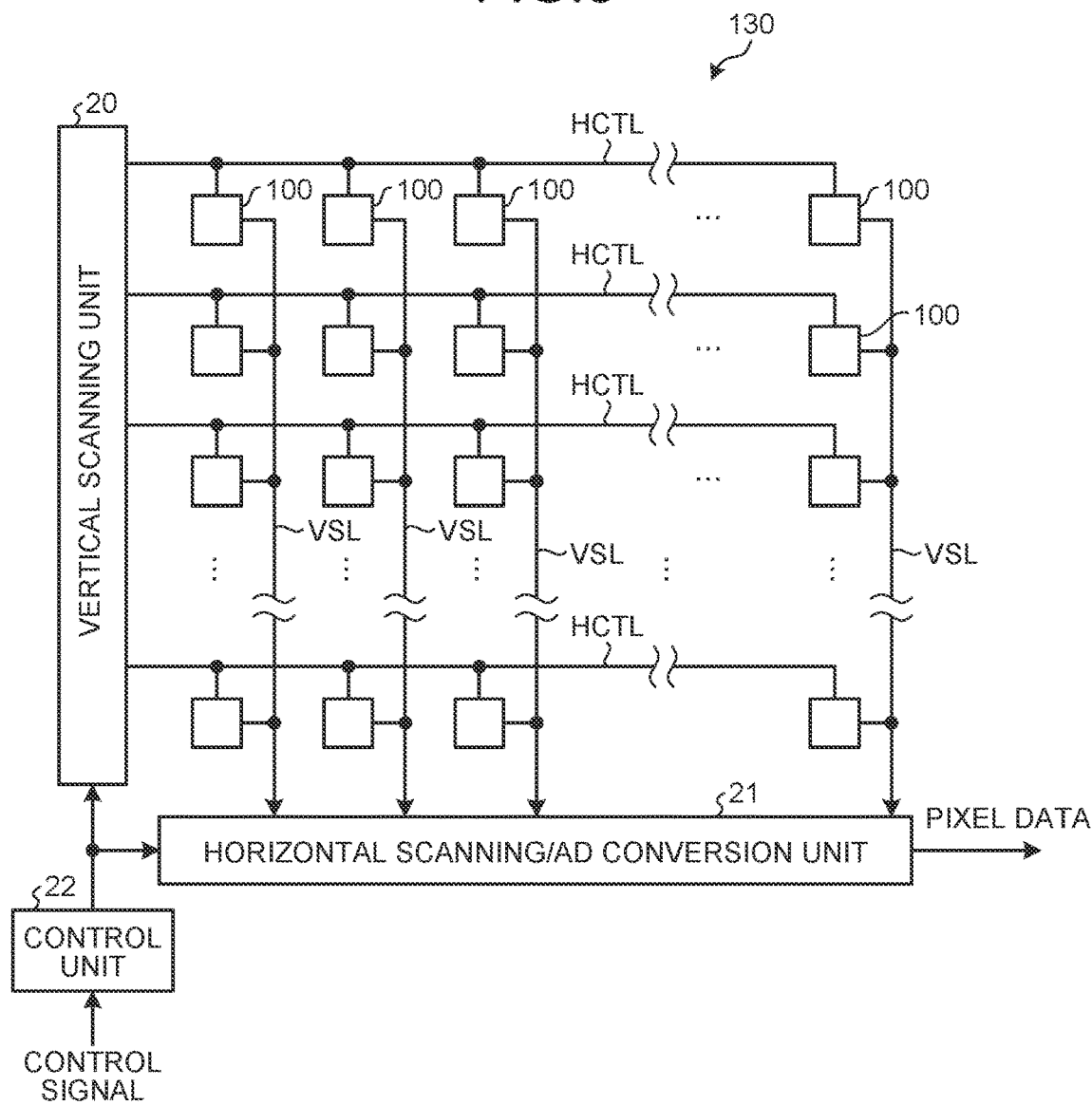
FIG. 5 is a block diagram illustrating a configuration of an example of an imaging unit applicable to each of the embodiments.

FIG. 5 is a block diagram illustrating a configuration of an example of an imaging unit applicable to each of the embodiments. In FIG. 5, the imaging unit includes a pixel array unit 130, a vertical scanning unit 20, a horizontal scanning/AD conversion unit 21, and a control unit 22. Among the above, the vertical scanning unit 20, the horizontal scanning/AD conversion unit 21, and the control unit 22 correspond to, for example, the exposure control unit 101 in FIG. 1.

The pixel array unit 130 includes a plurality of pixels 100 each having a light receiving element that generates a voltage corresponding to received light. A photodiode can be used as the light receiving element. In the pixel array unit 130, the plurality of pixels 100 is arrayed in a matrix in a horizontal direction (row direction) and a vertical direction (column direction). In the pixel array unit 130, an arrangement of the pixels 100 in the row direction is referred to as a line. An image (image data) of one frame is formed on the basis of pixel signals read from a predetermined number of lines in the pixel array unit 130. For example, in a case where an image of one frame is formed with 3000 pixels× 2000 lines, the pixel array unit 130 includes at least 2000 lines each of which includes at least 3000 pixels 100.

In addition, with respect to the rows and columns of the pixels 100 in the pixel array unit 130, a pixel signal line HCTL is connected to each row and a vertical signal line VSL is connected to each column.

An end of the pixel signal line HCTL which end is not connected to the pixel array unit 130 is connected to the vertical scanning unit 20. The vertical scanning unit 20 transmits a plurality of control signals such as a drive pulse at the time of reading a pixel signal from each of the pixels 100 to the pixel array unit 130 via the pixel signal line HCTL according to the control signal supplied from the control unit 22, for example. An end of the vertical signal line VSL which end is not connected to the pixel array unit 130 is connected to the horizontal scanning/AD conversion unit 21.

The horizontal scanning/AD conversion unit 21 includes an analog to digital (AD) conversion unit, an output unit, and a signal processing unit. The pixel signal read from the pixel 100 is transmitted to the AD conversion unit of the horizontal scanning/AD conversion unit 21 via the vertical signal line VSL.

Control on reading of a pixel signal from the pixel 100 will be schematically described. Charges accumulated in the light receiving element by exposure are transferred to a floating diffusion (FD) layer and the transferred charges are converted into a voltage in the floating diffusion layer, whereby the reading of the pixel signal from the pixel 100 is performed. The voltage acquired by conversion of the charge in the floating diffusion layer is output to the vertical signal line VSL via an amplifier.

More specifically, in the pixel 100, a state between the light receiving element and the floating diffusion layer is in an off (opened) state and a charge generated according to incident light by photoelectric conversion is accumulated in the light receiving element during the exposure. After the exposure is ended, the floating diffusion layer and the vertical signal line VSL are connected according to a selection signal supplied via the pixel signal line HCTL. Furthermore, the floating diffusion layer is connected to the power supply voltage VDD or a supply line of a black level voltage in a short period according to a reset pulse supplied via the pixel signal line HCTL, and the floating diffusion layer is reset. A voltage of a reset level of the floating diffusion layer (referred to as a voltage P) is output to the vertical signal line VSL. Subsequently, the state between the light receiving element and the floating diffusion layer is brought into an on (closed) state by a transfer pulse supplied via the pixel signal line HCTL, and the charges accumulated in the light receiving element are transferred to the floating diffusion layer. A voltage corresponding to a charge amount of the floating diffusion layer (referred to as a voltage Q) is output to the vertical signal line VSL.

In the horizontal scanning/AD conversion unit 21, the AD conversion unit includes an AD converter provided for each of the vertical signal lines VSL, and AD conversion processing is performed by the AD converter on the pixel signal supplied from the pixel 100 via each of the vertical signal lines VSL and two digital values (values respectively corresponding to the voltage P and the voltage Q) for correlated double sampling (CDS) processing for the noise reduction are generated.

The CDS processing is performed by the signal processing unit on the two digital values generated by the AD converter, and a pixel signal (pixel data) by the digital signals is generated. The generated pixel data is output from the imaging unit.

Under the control of the control unit 22, the horizontal scanning/AD conversion unit 21 sequentially outputs the digital values temporarily and respectively held by the AD converters to the signal processing unit by performing selective scanning to select, in predetermined order, the AD converters for the respective vertical signal lines VSL. The horizontal scanning/AD conversion unit 21 realizes this operation by a configuration including, for example, a shift register, an address decoder, and the like.

The control unit 22 performs drive control of the vertical scanning unit 20, the horizontal scanning/AD conversion unit 21, and the like according to a control signal from the overall control unit 16, for example. The control unit 22 generates various drive signals to be references for the operation of the vertical scanning unit 20 and the horizontal scanning/AD conversion unit 21. The control unit 22 generates a control signal, which is to be supplied to each of the pixels 100 via the pixel signal line HCTL by the vertical scanning unit 20, on the basis of a vertical synchronization signal or an external trigger signal supplied from the outside (such as the control unit 16) and a horizontal synchronization signal. The control unit 22 supplies the generated control signal to the vertical scanning unit 20.

On the basis of the control signal supplied from the control unit 22, the vertical scanning unit 20 supplies various signals including the drive pulse to each of the pixels 100 line by line in the pixel signal line HCTL of the selected pixel row of the pixel array unit 130, and causes the pixels 100 to respectively output the pixel signals to the vertical signal lines VSL. The vertical scanning unit 20 includes, for example, a shift register, an address decoder, and the like.

The imaging unit configured in such a manner is a column AD-type complementary metal oxide semiconductor (CMOS) image sensor in which the AD converters are arranged for each column.

Figure 6:
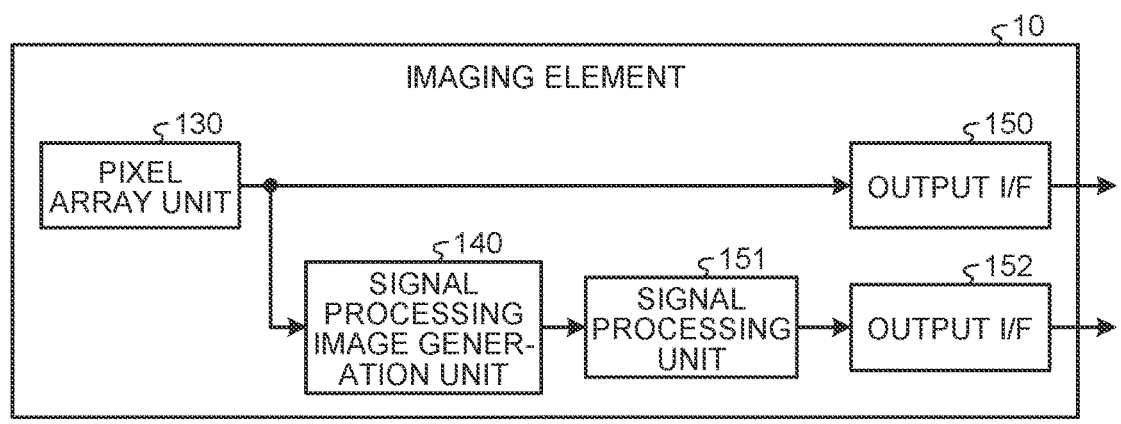
FIG. 6 is a block diagram illustrating a configuration of an example of an imaging element according to each of the embodiments.

FIG. 6 is a block diagram illustrating a configuration of an example of the imaging element 10 according to each of the embodiments. In FIG. 6, the imaging element 10 includes a pixel array unit 130, a signal processing image generation unit 140, output I/Fs 150 and 152, and a signal processing unit 151. Note that illustration of configurations other than the pixel array unit 130 included in the imaging unit is omitted in FIG. 6.

The output I/F 150 is an interface to output the pixel data output from the pixel array unit 130 to the outside of the imaging element 10.

The signal processing image generation unit 140 corresponds to the signal processing image generation unit 102 in FIG. 1, and generates pieces of pixel data respectively corresponding to a plurality of luminance regions having continuous luminance values on the basis of the pixel data output from the pixel array unit 130. The signal processing unit 151 corresponds to the signal processing unit 103 in FIG. 1, and performs predetermined signal processing such as recognition processing on the pieces of pixel data that respectively correspond to the plurality of luminance regions and that are output from the signal processing image generation unit 140.

A processing result from the signal processing unit 151 is output to the outside of the imaging element 10 via the output I/F 152. Furthermore, the output I/F 150 is an interface to output the pixel data output from the pixel array unit 130 to the outside of the imaging element 10. A mobile industry processor interface (MIPI) can be applied to each of the output I/Fs 150 and 152.

The imaging element 10 is formed on one semiconductor chip, for example. This is not a limitation, and the imaging element 10 can be formed as a stacked structure in which two semiconductor substrates are stacked. In this case, a pixel array unit 130 can be formed on a first semiconductor substrate, and other configurations can be formed on a second semiconductor substrate. Furthermore, although the imaging element 10 is illustrated to include the signal processing unit 151 in FIG. 6, this example is not a limitation. For example, the signal processing unit 151 can also be provided outside the imaging element 10.

(Configuration Example of Hardware Applicable to Each Embodiment)

Figure 7:
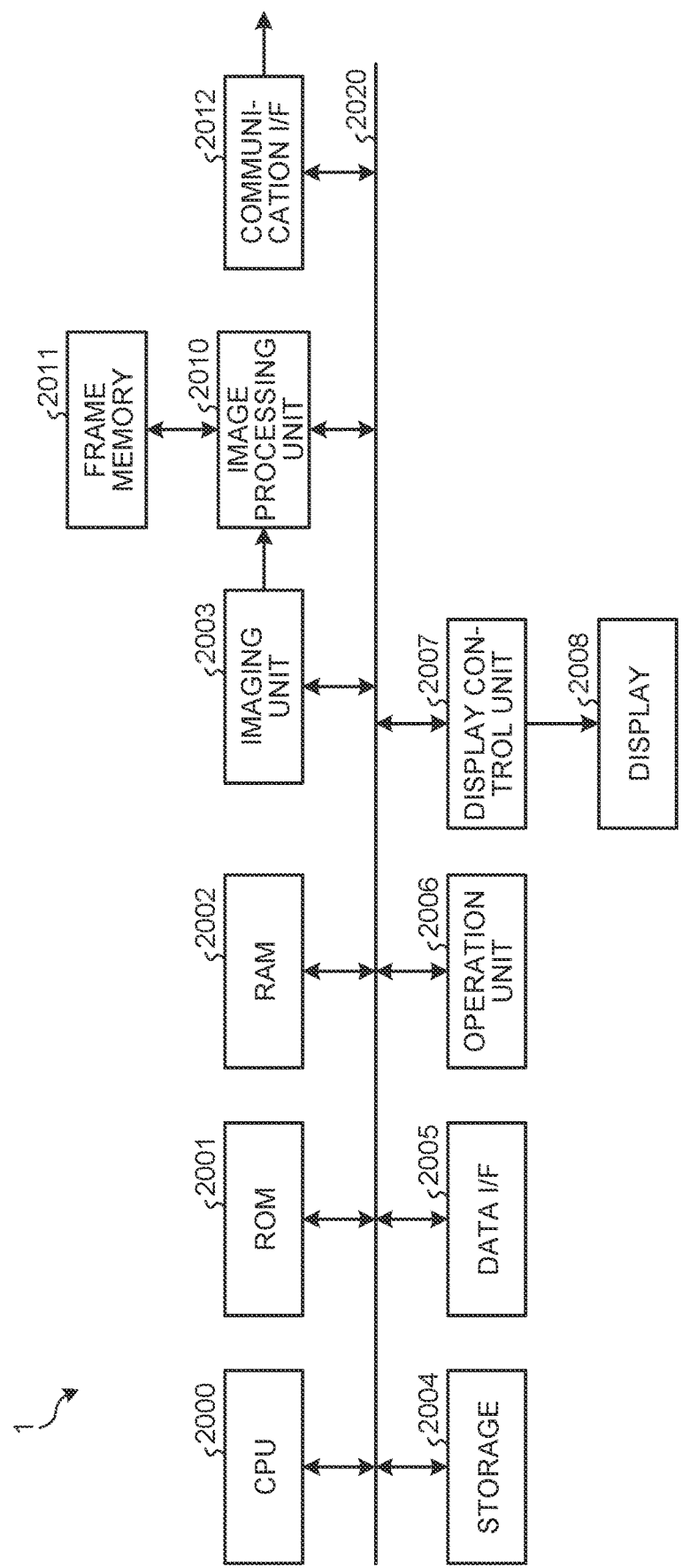
FIG. 7 is a block diagram illustrating an example of a hardware configuration of an imaging device applicable to each of the embodiments.

FIG. 7 is a block diagram illustrating an example of a hardware configuration of the imaging device 1 applicable to each of the embodiments. In FIG. 7, the imaging device 1 includes a CPU 2000, a read only memory (ROM) 2001, a random access memory (RAM) 2002, an imaging unit 2003, a storage 2004, a data I/F 2005, an operation unit 2006, and a display control unit 2007 each of which is connected by a bus 2020. In addition, the imaging device 1 includes an image processing unit 2010 and a communication I/F 2012 each of which is connected by the bus 2020.

The CPU 2000 controls the entire operation of the imaging device 1 by using the RAM 2002 as a work memory according to a program stored in advance in the ROM 2001.

The imaging unit 2003 corresponds to the imaging element 10 in FIG. 2, performs imaging, and outputs pixel data. The pixel data output from the imaging unit 2003 is supplied to, for example, the image processing unit 2010. The image processing unit 2010 corresponds to the image processing unit 12 in FIG. 2, and performs predetermined image processing on the pixel data supplied from the imaging unit 2003 and generates image data in units of frames by using a frame memory 2011.

Furthermore, the imaging unit 2003 can perform recognition processing on the basis of the captured pixel data. A recognition result is passed to the CPU 2000, for example.

The communication I/F 2012 corresponds to the communication unit 18 in FIG. 2, and is an interface to perform communication between the imaging device 1 and the outside. For example, the communication I/F 2012 is connected to an access point of the Internet by wireless communication, and can communicate with a server or the like connected to the Internet.

The storage 2004 corresponds to the recording unit 14 in FIG. 2, is, for example, a flash memory, and can store and accumulate the image data output from the image processing unit 2010. In addition, the storage 2004 can also store a program for operating the CPU 2000. Furthermore, the storage 2004 is not limited to the configuration built in the imaging device 1, and may be a configuration detachable from the imaging device 1.

The data I/F 2005 is an interface for the imaging device 1 to transmit and receive data to and from the external device. For example, a universal serial bus (USB) can be applied as the data I/F 2005. Furthermore, an interface that performs near field communication such as Bluetooth (registered trademark) can be applied as the data I/F 2005.

The operation unit 2006 corresponds to the input unit 17 in FIG. 2 and receives a user operation on the imaging device 1. The operation unit 2006 can include an operator such as a dial or a button as an input device that receives a user input. The operation unit 2006 may include, as an input device, a touch panel that outputs a signal corresponding to a contact position.

The display control unit 2007 corresponds to the display control unit 13 in FIG. 2, and generates a display signal, which can be displayed by a display 2008, on the basis of a display control signal passed from the CPU 2000. The display 2008 uses, for example, a liquid crystal display (LCD) as a display device, and displays a screen corresponding to a display signal generated by the display control unit 2007. Note that the display control unit 2007 and the display 2008 can be omitted depending on a purpose of the imaging device 1.

3. First Embodiment of the Present Disclosure

Next, the first embodiment of the present disclosure will be described.

(3-1. Configuration According to the First Embodiment)

Figure 8:
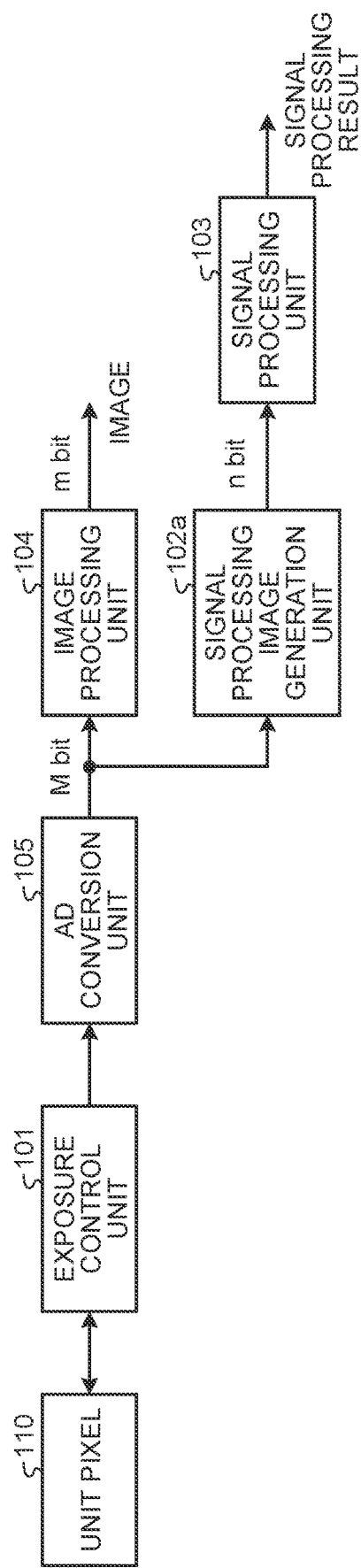
FIG. 8 is a functional block diagram of an example for describing a function of an imaging device according to a first embodiment.

First, the configuration according to the first embodiment will be described. FIG. 8 is a functional block diagram of an example which diagram is for describing a function of an imaging device according to the first embodiment. In FIG. 8, in an imaging device 1a, an AD conversion unit 105 is added to the imaging device 1 illustrated in FIG. 1.

Furthermore, in a unit pixel 110, sensitivity to light of some (such as two) pixels 100 among four pixels 100 included in the unit pixel 110 is set to be lower than sensitivity to light of the remaining pixels 100. Hereinafter, pixels in which the sensitivity to light is lowered are referred to as low sensitivity pixels, and other pixels are referred to as high sensitivity pixels. It is possible to realize the low sensitivity pixels, for example, by making an area of a light receiving surface smaller than that of the high sensitivity pixels. This is not a limitation, and it is possible to realize the high sensitivity pixels and the low sensitivity pixels by varying amounts of exposure time of pixels 100 included in the unit pixel 110.

An exposure control unit 101 adds pixel signals of the four pixels 100 of the low sensitivity pixels and the high sensitivity pixels included in the unit pixel 110, and outputs a result as one pixel signal. An AD conversion unit 105 converts the pixel signal output from the exposure control unit 101 into pixel data having a bit width of M bits by AD conversion. The AD conversion unit 105 supplies the converted pixel data to a signal processing image generation unit 102a and an image processing unit 104. The image processing unit 104 converts the pixel data that has the bit width of M bits and that is supplied from the AD conversion unit 105 into m-bit pixel data by quantization processing or the like, and outputs an image by the m-bit pixel data.

Here, it is assumed that an input bit width of a signal processing unit 103 is n bits, and a bit width of the image data output from the image processing unit 104 is m bits. The values M, m, and n representing the bit widths are not necessarily equal to each other. When n>M, the signal processing image generation unit 102a supplies, to the signal processing unit 103, the pixel data supplied from the AD conversion unit 105 as it is or after addition of a dummy bit in such a manner that the bit width becomes n bits.

On the other hand, in a case of M>n, the signal processing image generation unit 102a splits the pixel data supplied from the AD conversion unit 105 into blocks of every n bits from a most significant bit (MSB). In a case where a block having a bit width of less than n bits is generated on a side of a least significant bit (LSB), a dummy bit is added to the block and the bit width is set to n bits.

(3-2. Processing According to the First Embodiment)

Figure 9:
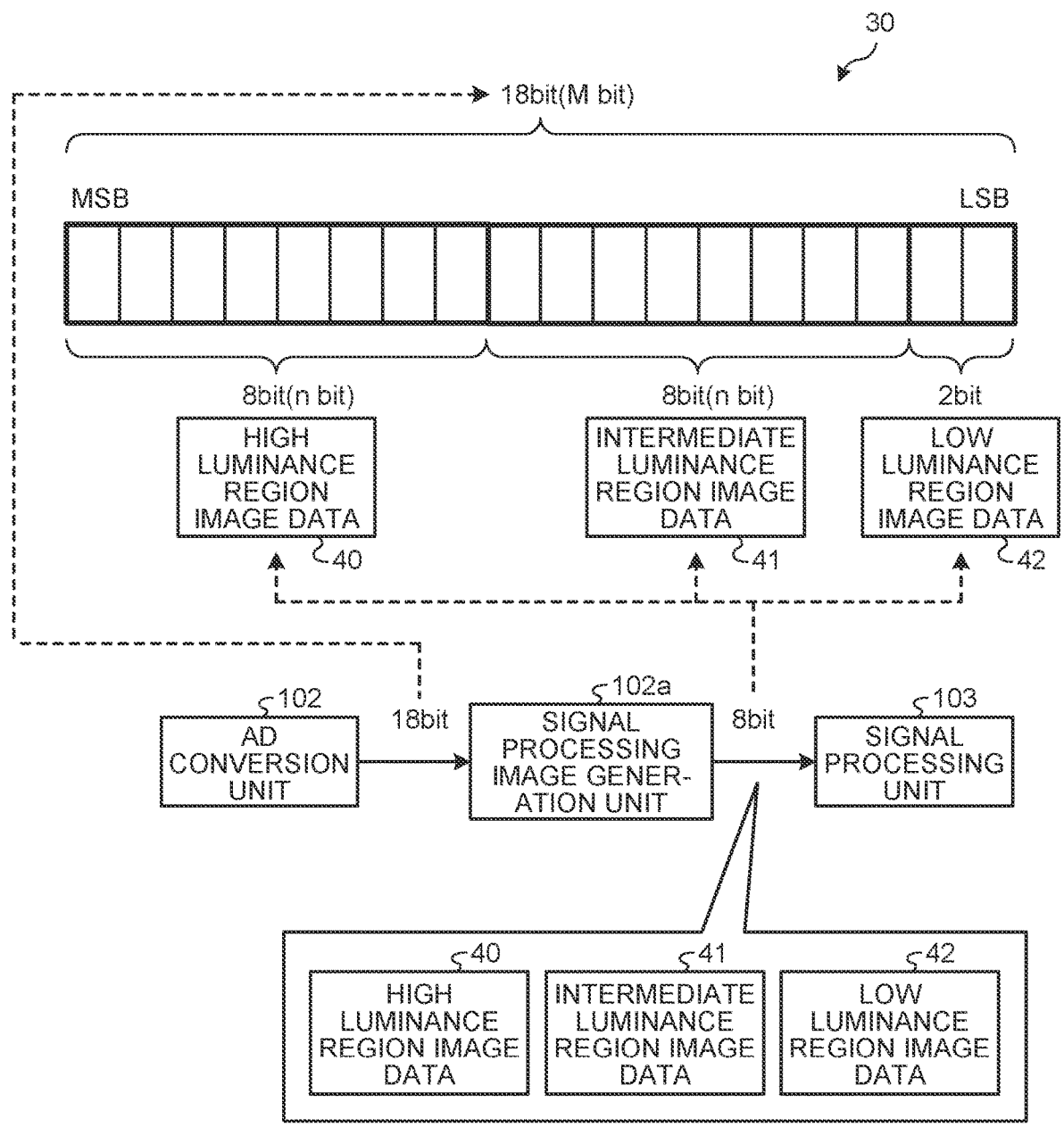
FIG. 9 is a schematic diagram for describing pixel data split processing according to the first embodiment.

Next, the processing according to the first embodiment will be described more specifically. FIG. 9 is a schematic diagram for describing pixel data split processing according to the first embodiment. Here, it is assumed that M=18 and n=8, a bit width of pixel data 30 supplied from the AD conversion unit 105 to the signal processing image generation unit 102a is 18 bits, and an input bit width of the signal processing unit 103 is 8 bits.

The signal processing image generation unit 102a splits the pixel data 30 having the bit width of 18 bits every 8 bits from the MSB. Hereinafter, the pieces of split pixel data acquired by the split are respectively referred to as high luminance region pixel data, intermediate luminance region pixel data, and low luminance region pixel data from the MSB side, and pieces of image data generated from the pieces of pixel data for one frame are respectively referred to as high luminance region image data 40, intermediate luminance region image data 41, and low luminance region image data 42. More specifically, in the 18-bit pixel data 30, 8-bit pixel data from the MSB to a bit position of the 11th bit are included in the high luminance region image data 40, and 8-bit pixel data from the bit position of the 10th bit to the third bit are included in the intermediate luminance region image data 41. Furthermore, 2-bit pixel data at bit positions of the second bit and the first bit (LSB) are included in the low luminance region image data 42.

Figure 10:
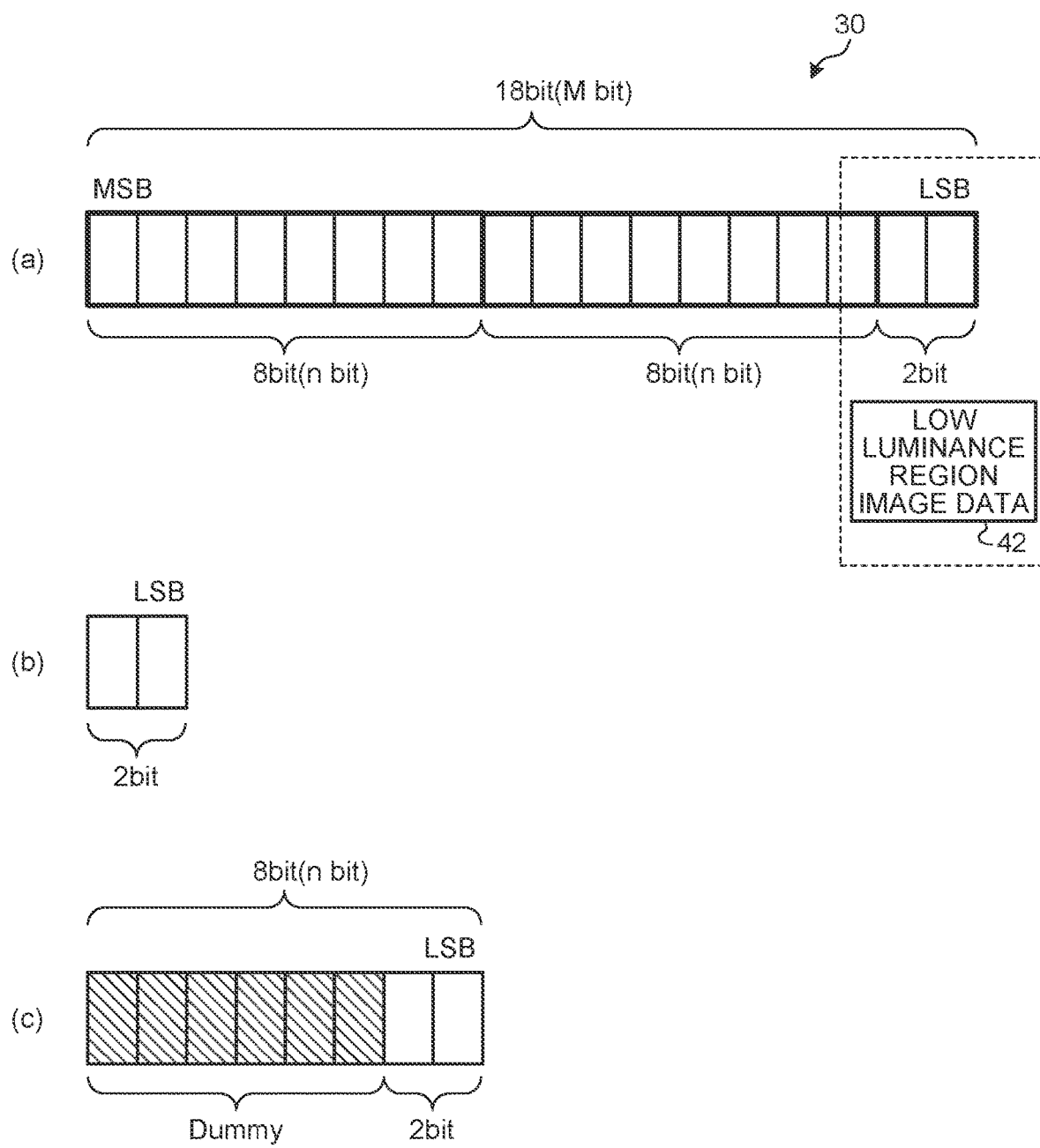
FIG. 10 is a schematic diagram for describing processing on a low luminance region image according to one embodiment.

FIG. 10 is a schematic diagram for describing processing on the low luminance region image data 42 according to the first embodiment. As illustrated in a section (a) of FIG. 10, the bit width of the pixel data 30 supplied from the AD conversion unit 105 is 18 bits in this example. Thus, when the pixel data 30 is split from the MSB in accordance with 8 bits of the input data width of the signal processing unit 103, a block having a bit width of less than 8 bits is generated on the LSB side as illustrated in a dotted frame in the drawing. In this example, a 2-bit block is generated on the LSB side, the block being the low luminance region image data 42.

When the signal processing unit 103 can receive data having a bit width of less than 8 bits (less than n bits), the signal processing image generation unit 102a supplies the 2-bit data as it is to the signal processing unit 103 as illustrated in a section (b) of FIG. 10.

On the other hand, when the signal processing unit 103 can receive only data having a bit width of 8 bits (n bits), dummy data (described as Dummy in the drawing) is added to the 2-bit data and data having a data width of 8 bits is generated as illustrated in a section (c) of FIG. 10. The data that has the data width of 8 bits and is generated by the addition of the dummy data is supplied to the signal processing unit 103.

Figure 11A:
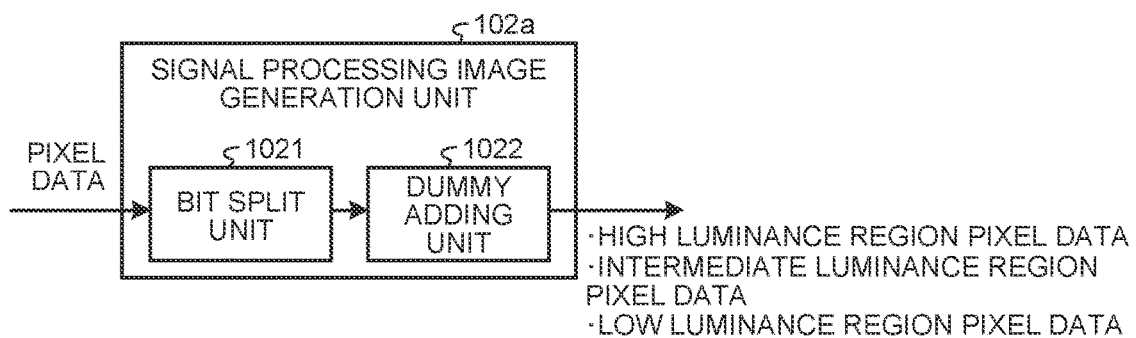
FIG. 11A is a block diagram illustrating a schematic configuration example of a signal processing image generation unit according to the first embodiment.
Figure 11B:
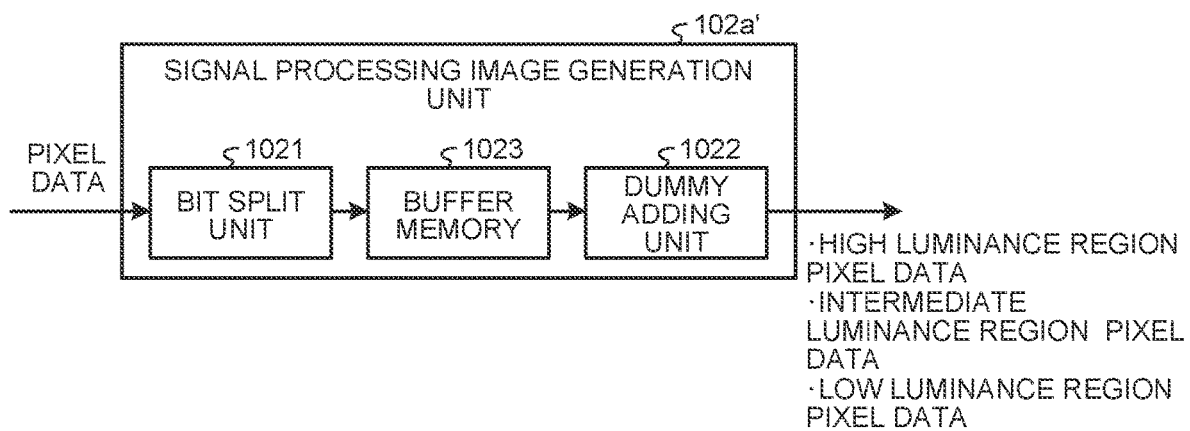
FIG. 11B is a block diagram illustrating a schematic configuration example of the signal processing image generation unit according to the first embodiment.

FIG. 11A and FIG. 11B are block diagrams illustrating a schematic configuration example of the signal processing image generation unit 102a according to the first embodiment.

A configuration example of a case where dummy data is added in units of pixel data is illustrated in FIG. 11A. The pixel data 30 supplied from the AD conversion unit 105 to the signal processing image generation unit 102a is input to a bit split unit 1021 and is split into pieces of pixel data respectively having bit widths of 8 bits, 8 bits, and 2 bits (high luminance region pixel data, intermediate luminance region pixel data, and low luminance region pixel data) as described with reference to FIG. 9. The bit split unit 1021 passes, to a dummy adding unit 1022, the pieces of split pixel data respectively having the bit widths of 8 bits, 8 bits, and 2 bits.

The dummy adding unit 1022 adds dummy bits to the pixel data, the bit width of which is less than 8 bits that is the input data width of the signal processing unit 103, among the pieces of pixel data, which are acquired by the split of the pixel data 30 and are passed from the bit split unit 1021, in such a manner that the bit width thereof becomes 8 bits. In this example, dummy bits for 6 bits are added on a high order side of a high order bit of the 2-bit low luminance region pixel data on the LSB side of the pixel data 30. The dummy bits are, for example, bits having a value "0".

The dummy adding unit 1022 outputs the high luminance region pixel data, the intermediate luminance region pixel data, and the low luminance region pixel data to which the dummy bits are added and which has the bit width of 8 bits, and supplies the pieces of pixel data to the signal processing unit 103.

A configuration example of a case where dummy data is added in units of image data (in units of frames) is illustrated in FIG. 11B. Pixel data 30 supplied from the AD conversion unit 105 to a signal processing image generation unit 102a' is split into pieces of pixel data respectively having bit widths of 8 bits, 8 bits, and 2 bits (high luminance region pixel data, intermediate luminance region pixel data, and low luminance region pixel data) in the bit split unit 1021.

Each of the pieces of pixel data split by the bit split unit 1021 is supplied to a buffer memory 1023. In this example, the buffer memory 1023 has a capacity capable of storing at least two frames of image data in which a bit width of pixel data is 8 bits and one frame of image data in which a bit width of pixel data is 2 bits. The signal processing image generation unit 102a' keeps storing pieces of pixel data in the buffer memory 1023 until pieces of pixel data (high luminance region pixel data, intermediate luminance region pixel data, and low luminance region pixel data) are stored respectively for one frame in the buffer memory 1023.

When the pieces of pixel data are stored respectively for one frame in the buffer memory 1023, the signal processing image generation unit 102a' respectively reads the pieces of pixel data from the buffer memory 1023 as image data for one frame, that is, the high luminance region image data 40, the intermediate luminance region image data 41, and the low luminance region image data 42, and supplies the pieces of image data to the dummy adding unit 1022.

The dummy adding unit 1022 adds dummy bits to each piece of pixel data of image data, a bit width of which pixel data included in the image data is less than 8 bits that are the input data width of the signal processing unit 103, among the pieces of image data (high luminance region image data 40, intermediate luminance region image data 41, and low luminance region image data 42) read from the buffer memory 1023 in such a manner that the bit width thereof becomes 8 bits. In this example, the dummy bits are added on a high order side of a high order bit of the 2-bit pixel data on the LSB side of the pixel data 30 which pixel data is included in the low luminance region image data 42.

The dummy adding unit 1022 outputs the high luminance region image data 40, the intermediate luminance region image data 41, and the low luminance region image data 42 including pieces of 8-bit pixel data in which dummy bits are added to each piece of pixel data, and supplies the pieces of image data to the signal processing unit 103.

As described above, according to the first embodiment, the pixel data 30 acquired by imaging is split into the pieces of pixel data respectively corresponding to the plurality of luminance regions, and the pieces of split pixel data are supplied to the signal processing unit 103. Thus, even in a case where the bit width of the pixel data 30 exceeds the input data width of the signal processing unit 103 that performs signal processing on the pixel data 30, the pixel data 30 can be supplied to the signal processing unit 103 without an information loss.

Thus, by applying the first embodiment, for example, it is possible to improve recognition accuracy of a case where the signal processing unit 103 recognizes a person or a face by using a neural network. Furthermore, since the captured image is split into the high luminance region image data 40, the intermediate luminance region image data 41, and the low luminance region image data 42 and supplied to the signal processing unit 103, for example, even in a case where a face or the like is completely invisible to human vision due to backlight or the like, recognition of the face becomes possible.

Furthermore, in a case where a deep neural network (DNN) is used as the signal processing unit 103, for example, each of a plurality of pieces of image data passed from the signal processing image generation unit 102a can be treated as data of each channel of an input to the DNN.

For example, as in the example of FIG. 9, in a case where the pixel data 30 is split into three and three pieces of image data that are the high luminance region image data 40, the intermediate luminance region image data 41, and the low luminance region image data 42 are generated, the signal processing unit 103 can handle each color of RGB and these three pieces of image data as data of 9 channels of 3×3. Furthermore, even in a case where the image data is monochrome, there are one channel for color and three channels for image data, and it is possible to handle the image data as three-channel data.

Thus, by splitting the pixel data into the pieces of image data of the plurality of luminance regions having continuous luminance values, the signal processing unit 103 can highly accurately execute the recognition processing using the DNN. Here, the signal processing image generation unit 102a generates the high luminance region pixel data, the intermediate luminance region pixel data, and the low luminance region pixel data in such a manner that bits in the pixel data 30 do not overlap. This is because in a case where any or all of the high luminance region pixel data, the intermediate luminance region pixel data, and the low luminance region pixel data include overlapping bits in the pixel data 30, the accuracy of the recognition processing may be deteriorated.

An effect of a case where the first embodiment is applied to the recognition processing will be described by utilization of specific numerical values. For simplicity, it is assumed that the image data supplied from the AD conversion unit 105 to the signal processing image generation unit 102a is a color image of each of RGB of M=8 bits, and it is assumed that n=3 bits. Furthermore, a recognition result by the recognition processing is indicated by accuracy of the recognition. A neural network of 10-class classification was used as the signal processing unit 103 and a recognition test was performed under the following experimental conditions.

Task: 10-class classification
Data set: 10,000 sets
Model: resnet18
    For the first embodiment, a model learned with 8-bit image data was processed and used.
    For an existing technology, a model learned by scratching with a data set was used since accuracy decreased greatly by utilization of a similar model.

In this case, 85.29 [%] was acquired as a recognition result of a case where bit reduction of the bit width of each piece of pixel data of the image data to n=3 bits was performed by the existing technology. On the other hand, 91.14 [%] was acquired as a recognition result of a case where the high luminance region image data 40, the intermediate luminance region image data 41, and the low luminance region image data 42 in which bit widths of pieces of pixel data were respectively 3 bits, 3 bits, and 2 bits were generated on the basis of the image data according to the first embodiment. As described above, it can be concluded that the technology according to the first embodiment has an effect.

4. Second Embodiment of the Present Disclosure

Next, the second embodiment of the present disclosure will be described. The second embodiment is an example in which pieces of image data of a plurality of luminance regions having continuous luminance values are generated in AD conversion processing of pixel data.

(4-1. Configuration According to the Second Embodiment)

First, a configuration according to the second embodiment will be described. FIG. 12 is a functional block diagram of an example for describing a function of an imaging device according to the second embodiment. In FIG. 12, an imaging device 1b is acquired by addition of an AD conversion unit 105v and N pieces of $105a_1$, $105a_2$, ..., and $105a_N$ to the imaging device 1 illustrated in FIG. 1. As an implementation example of such a configuration, for example, a configuration in which a plurality of AD conversion units is provided in each column of a pixel array unit 130 in the horizontal scanning/AD conversion unit 21 illustrated in FIG. 5 is conceivable.

Also in this example, similarly to the configuration of FIG. 8, an input bit width of a signal processing unit 103 is set to n bits, and a bit width of image data output from an image processing unit 104 is set to m bits.

A pixel signal output from an exposure control unit 101 is supplied to each of the plurality of AD conversion units 105v, $105a_1$, $105a_2$, ..., and $105a_N$. Among the plurality of AD conversion units 105v, $105a_1$, $105a_2$, ..., and $105a_N$, the AD conversion unit 105v performs AD conversion for the image processing unit 104. The AD conversion unit 105v converts the pixel signal supplied from the exposure control unit 101 into pixel data having a bit width of M bits and supplies the pixel data to the image processing unit 104.

The image processing unit 104 performs predetermined image processing such as a white balance adjustment and a gamma correction on the supplied pixel data having the bit width of M bits, further performs conversion into pixel data having a bit width of m bits by quantization processing or the like, and outputs an image of the pixel data.

On the other hand, each of the AD conversion units $105a_1$, $105a_2$, ..., and $105a_N$ among the plurality of AD conversion units 105v, $105a_1$, $105a_2$, ..., and $105a_N$ performs AD conversion, with a bit width of n bits, on each of a plurality of luminance regions having continuous luminance values of the supplied pixel signal. Each of pieces of pixel data that have a bit width of n bits and that are respectively acquired by the AD conversion of the pixel signal by the AD conversion units $105a_1$, $105a_2$, ..., and $105a_N$ is supplied to a signal processing image generation unit 102b.

Figure 13:
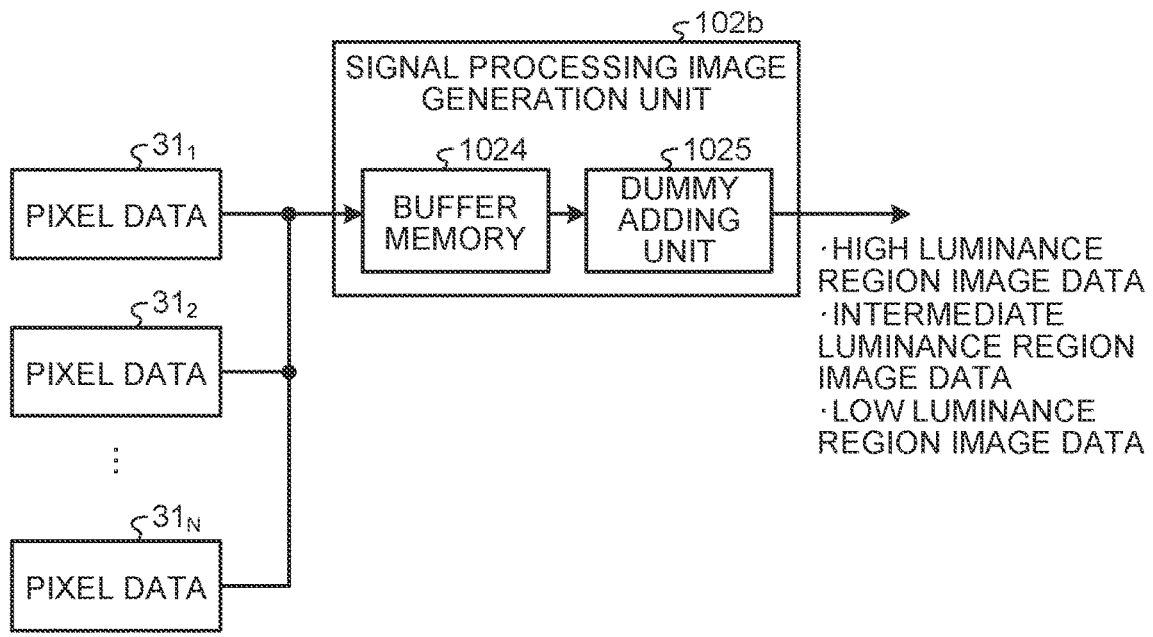
FIG. 13 is a block diagram illustrating a schematic configuration example of a signal processing image generation unit according to the second embodiment.

FIG. 13 is a block diagram illustrating a schematic configuration example of the signal processing image generation unit 102b according to the second embodiment. In FIG. 13, the signal processing image generation unit 102b includes a buffer memory 1024 and a dummy adding unit 1025. Pixel data $31_1$, $31_2$, ..., and $31_N$ on which the AD conversion is performed by the AD conversion units $105a_1$, $105a_2$, ..., and $105a_N$ are supplied to the signal processing image generation unit 102b and stored in the buffer memory 1024. Here, the buffer memory 1024 has a capacity capable of storing N frames of pixel data, for example.

For example, when the pixel data $31_1$ of one frame is stored in the buffer memory 1024, the signal processing image generation unit 102b reads the pixel data 31: of one frame from the buffer memory 1024 as one frame of image data of the pixel data $31_1$. Similarly, when being stored for one frame in the buffer memory 1024, each of the other pieces of pixel data $31_2$, ..., and $31_N$ is read from the buffer memory 1024 as one frame of image data of the pixel data.

Each of pieces of the image data read from the buffer memory 1024 is supplied to the dummy adding unit 1025, a dummy bit is added to each piece of the pixel data included in the image data as necessary, and the pieces of image data are output as high luminance region image data 40, intermediate luminance region image data 41, and low luminance region image data 42.

As described above, each of the AD conversion units $105a_1$, $105a_2$, ..., and $105a_N$ and the signal processing image generation unit 102b has a function of a generation unit that generates, on the basis of a pixel signal, processing pixel signals respectively corresponding to a plurality of luminance regions having continuous luminance values.

Note that in a case where each of the AD conversion units $105a_1$, $105a_2$, ..., and $105a_N$ performs AD conversion with a bit width being n bits and an input data width of the signal processing unit 103 is n bits, it is unnecessary to add a dummy bit to each piece of pixel data. Thus, the dummy adding unit 102b can be omitted in this case.

(4-2. Processing According to the Second Embodiment)

Figure 14:
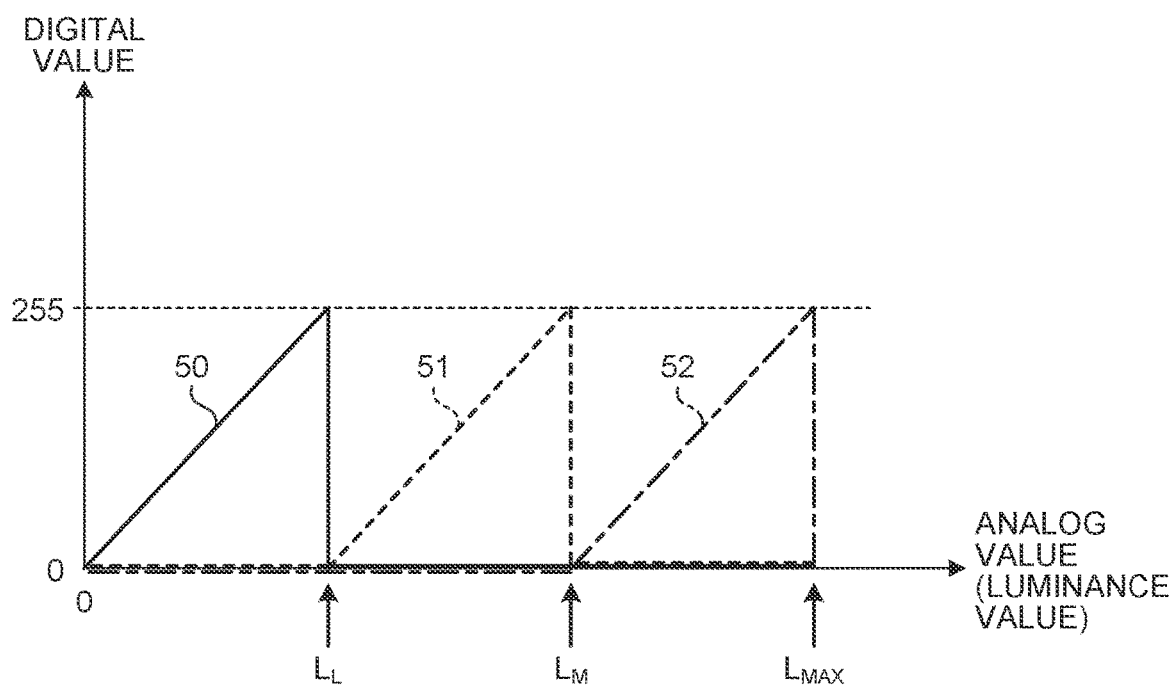
FIG. 14 is a schematic diagram for describing AD conversion processing according to the second embodiment.

Next, the processing according to the second embodiment will be described more specifically. FIG. 14 is a schematic diagram for describing the AD conversion processing according to the second embodiment. Note that, here, it is assumed that N=3 and the imaging device 1b includes three AD conversion units for the signal processing unit 103.

In FIG. 14, a horizontal axis indicates an analog value (luminance) of a pixel signal supplied from the exposure control unit 101, and a vertical axis indicates a digital value. On the horizontal axis, luminance "$L_{MAX}$" is maximum luminance of the pixel signal output from the exposure control unit 101. In the example of FIG. 14, a range from luminance "0" to the luminance "$L_{MAX}$" is split into three at luminance "$L_L$" and luminance "$L_M$" higher than the luminance "$L_L$".

Characteristic lines 50, 51, and 52 respectively indicate, for example, AD conversion characteristics by the AD conversion units $105a_1$, $105a_2$, and $105a_N$.

That is, in this example, as indicated by the characteristic line 50, the AD conversion unit $105a_1$ ignores a value exceeding the luminance value "$L_L$" (sets the digital value to "0") with respect to the pixel signal, performs the AD conversion on the luminance region from the luminance value "0" to the luminance value "$L_L$", and generates the low luminance region pixel data. As indicated by the characteristic line 51, an AD conversion unit $105a2$ ignores a value equal to or smaller than the luminance value "$L_L$" and a value exceeding the luminance value "$L_M$" with respect to the pixel signal, performs the AD conversion on the luminance region from the luminance value "$L_L$" to the luminance value "$L_M$" (the luminance value "$L_L$" itself is not included), and generates the intermediate luminance region pixel data. Furthermore, as indicated by the characteristic line 52, the AD conversion unit $105a_N$ ignores a value equal to or smaller than the luminance value "$L_M$" with respect to the pixel signal, performs the AD conversion on the luminance region from the luminance value "$L_M$" to the luminance value "$L_{MAX}$" (the luminance value "$L_M$" itself is not included), and generates the high luminance region pixel data.

As described above, each of the low luminance region pixel data, the intermediate luminance region pixel data, and the high luminance region pixel data acquired by the AD conversion of the pixel signal for each of the luminance regions is supplied to the signal processing image generation unit 102b.

Note that although the range from the luminance value "0" to the luminance value "$L_{MAX}$" is split into three equal parts in the example of FIG. 14, this example is not a limitation, and luminance ranges to be split may be different from each other. In addition, the number of splits is not limited to three.

The signal processing image generation unit 102b packs the image data of each of the plurality of luminance regions generated as described above and passes the packed image data to the signal processing unit 103.

Figure 15:
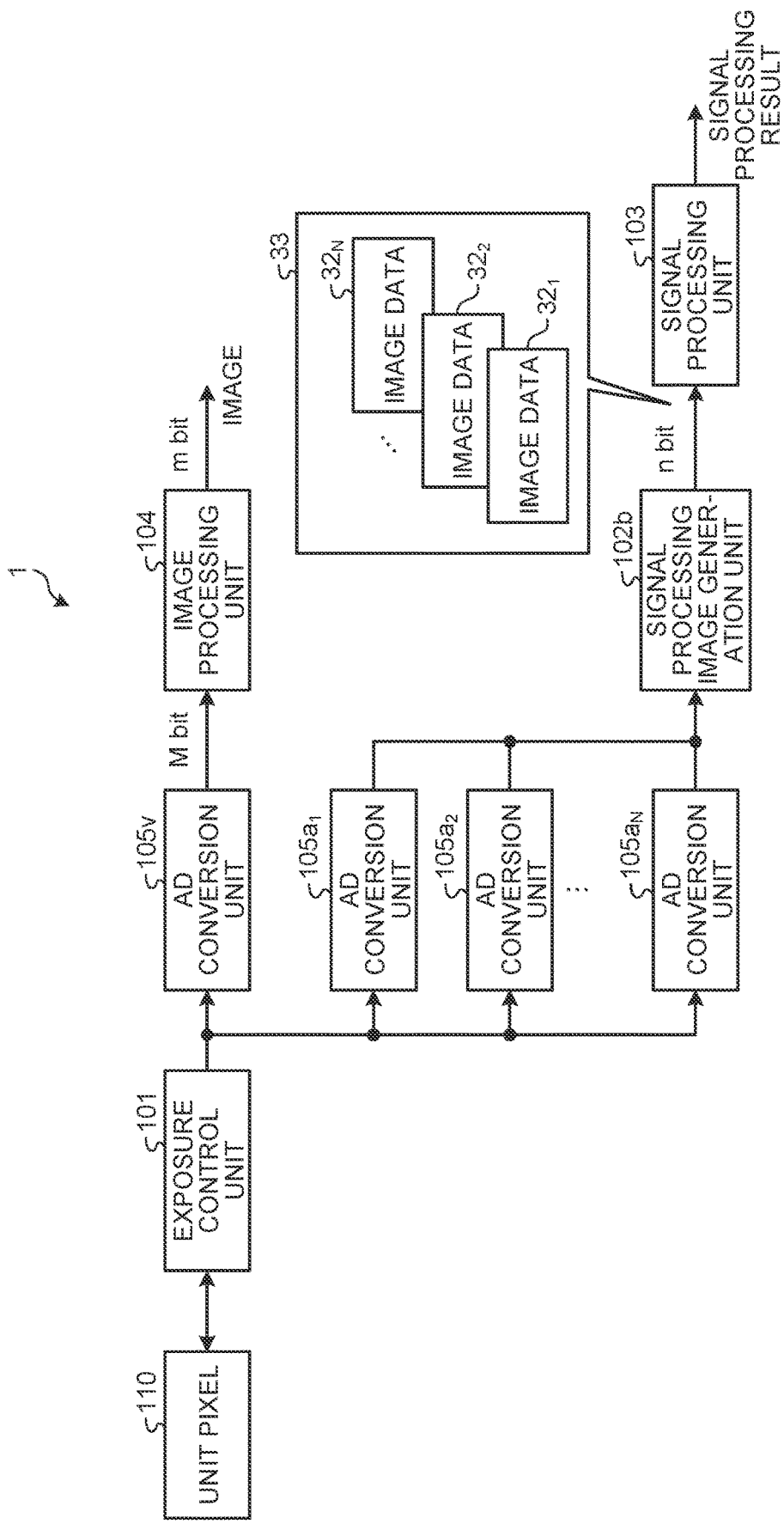
FIG. 15 is a schematic diagram for describing image data output from the signal processing image generation unit according to the second embodiment.

FIG. 15 is a schematic diagram for describing the image data output from the signal processing image generation unit 102b according to the second embodiment. In FIG. 15, the signal processing image generation unit 102b packs, as a group of packing data 33, the plurality of pieces of image data $32_1$, $32_2$, ..., and $32_N$ acquired respectively by the conversion of the pixel signal into the plurality of luminance regions having the continuous luminance values by the AD conversion units $105a_1$, $105a_2$, ..., and $105a_N$, and passes the packed data to the signal processing unit 103.

Various packing methods for the plurality of pieces of image data are conceivable. As an example, each of the pieces of image data is treated as a bit string and the bit strings of the pieces of image data are sequentially connected, whereby packing data 33 is configured. Since the number of included pixels (the number of unit pixels) and a bit length of pixel data are known with respect to each of the pieces of image data, each of the pieces of image data can be extracted from the packing data 33 by designation of a bit position with respect to the packing data 33. This is not a limitation, and it is also conceivable to sequentially array the pieces of image data for each bit.

Also in the second embodiment, effects similar to the effects in the first embodiment described above can be acquired.

5. Third Embodiment of the Present Disclosure

Next, the third embodiment of the present embodiment will be described. The third embodiment is an example of generating image data of a plurality of luminance regions having continuous luminance values by varying amounts of exposure time.

(5-1. Configuration According to the Third Embodiment)

Figure 16:
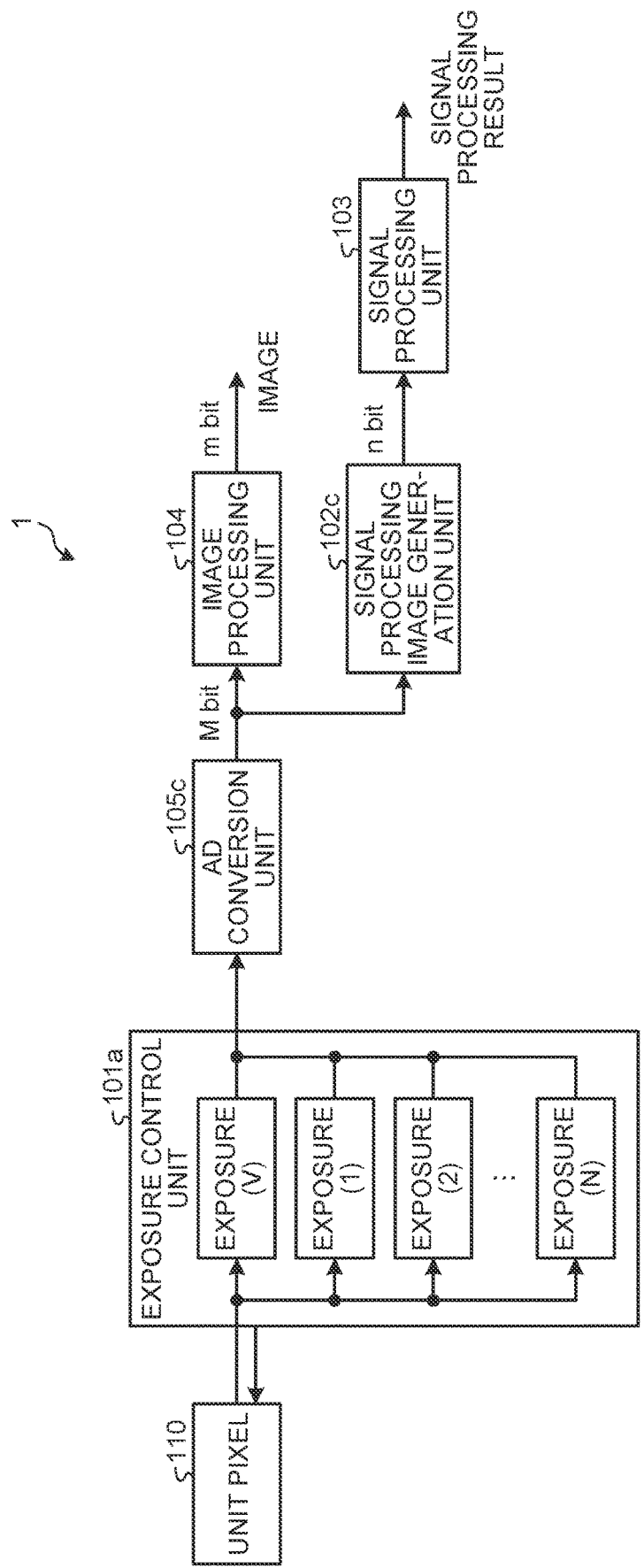
FIG. 16 is a functional block diagram of an example for describing a function of an imaging device according to a third embodiment.

First, the configuration according to the third embodiment will be described. FIG. 16 is a functional block diagram of an example for describing a function of an imaging device according to the third embodiment. In FIG. 16, an imaging device 1c performs exposure control on a unit pixel 110 by a plurality of exposures (V), (1), (2), ..., and (N) for different amounts of exposure time in an exposure control unit 101a.

Also in this example, similarly to the configuration of FIG. 8, an input bit width of a signal processing unit 103 is set to n bits, and a bit width of image data output from the image processing unit 104 is set to m bits. Furthermore, an AD conversion unit 105c converts a pixel signal supplied from the exposure control unit 101a into pixel data having a data width of M bits by AD conversion. Here, it is assumed that M>n. However, M=n or M<n can be conceivable. In the following description, it is assumed that M>n.

The AD conversion unit 105c converts each of pixel signals, which are generated by the plurality of exposures (V), (1), (2), ..., and (N) by the exposure control unit 101a, into the pixel data having the bit width of M bits.

Among the pieces of pixel data converted by the AD conversion unit 105c, the pixel data acquired by the conversion of the pixel signal generated by the exposure (V) is supplied to the image processing unit 104. The image processing unit 104 performs predetermined image processing such as a white balance adjustment and a gamma correction on the supplied pixel data having the bit width of M bits, further performs conversion into pixel data having a bit width of m bits by quantization processing or the like, and outputs an image of the pixel data.

On the other hand, among the pieces of pixel data converted by the AD conversion unit 105c, the pieces of pixel data acquired by the conversion of the pixel signals generated by the exposure (1), the exposure (2), . . . , and the exposure (N) are supplied to a signal processing image generation unit 102c. The signal processing image generation unit 102c converts each of the pieces of pixel data supplied from the AD conversion unit 105c into pixel data having a data width of n bits.

At this time, the signal processing image generation unit 102c converts each of the pieces of pixel data into pixel data of a luminance region corresponding to corresponding exposure time. As an example, it is assumed that the exposure (1) has the longest exposure time, the exposure time is sequentially shortened thereafter, and the exposure (N) has the shortest exposure time. In this case, the pixel data is converted into pixel data of a luminance region with lower luminance as the exposure time is shorter, and the pixel data is converted into pixel data of a luminance region with higher luminance in the longer exposure time. More specifically, with N=3, the signal processing image generation unit 102c converts the pixel data from the exposure (1) and generates low luminance region pixel data, converts the pixel data from the exposure (2) and generates intermediate luminance region pixel data, and converts the pixel data from the exposure (N) and generates high luminance region pixel data.

As described above, the exposure control unit 101a and the signal processing image generation unit 102c have a function of a generation unit that generates, on the basis of a pixel signal, processing pixel signals respectively corresponding to a plurality of luminance regions having continuous luminance values.

(5-2. Processing According to the Third Embodiment)

Next, the processing according to the third embodiment will be described in more detail. For the conversion processing of the pixel data by the signal processing image generation unit 102c as described above, a pixel data split processing method described with reference to FIG. 9 and FIG. 10 in the first embodiment can be applied. At this time, as a configuration of the signal processing image generation unit 102c, the configuration including the buffer memory 1024 and the dummy adding unit 1025 described with reference to FIG. 13 can be applied. In this case, the signal processing image generation unit 102c can perform the split processing by designating, for example, a reading bit position and a bit width for each of the pieces of pixel data by the exposures (1), (2), and (N) stored in the buffer memory 1024.

This is not a limitation. AD conversion units may be respectively provided for the exposures (1), (2), . . . , and (N), and the AD conversion units may perform AD conversion on the pixel signals by applying the method described with reference to FIG. 14 in the second embodiment. In this case, with N=3, for the pixel signal generated by the exposure (1) with the longest exposure time, AD conversion is performed on a region with a low level of the pixel signal and pixel data having a bit width of n bits (low luminance region pixel data) is generated. For the pixel signal generated by the exposure (2) with intermediate exposure time, the AD conversion is performed on a region at an intermediate level of the pixel signal and pixel data having a bit width of n bits (intermediate luminance region pixel data) is generated. For a pixel signal generated by the exposure (N) with the shortest exposure time, the AD conversion is performed on a region at a high level of the pixel signal and pixel data having a bit width of n bits (high luminance region pixel data) is generated.

The signal processing image generation unit 102c generates low luminance region image data, intermediate luminance region image data, and high luminance region image data while adding dummy data as necessary according to each of the low luminance region pixel data, the intermediate luminance region pixel data, and the high luminance region pixel data generated as described above. The signal processing image generation unit 102c passes the generated low luminance region image data, intermediate luminance region image data, and high luminance region image data to the signal processing unit 103. At this time, similarly to the signal processing image generation unit 102b in the second embodiment, the signal processing image generation unit 102c can generate one piece of packing data 33 by packing the low luminance region image data, the intermediate luminance region image data, and the high luminance region image data, and pass this packing data 33 to the signal processing unit 103.

(Exposure Control for Each Pixel of Unit Pixel)

The exposure control unit 101a can independently perform the exposure control on each of the plurality of pixels 100 included in the unit pixel 110. For example, in a case where the unit pixel 110 has a configuration of two pixels× two pixels as illustrated in FIG. 4, two pixel signal lines HCTL independent from each other are provided for each row, and these two pixel signal lines HCTL are respectively connected to the two pixels 100 aligned in a row direction in the unit pixel 110. That is, four pixel signal lines HCTL are connected to the unit pixel 110. As a result, the four pixels 100 included in the unit pixel 110 can be exposed for different amounts of exposure time.

Here, it is assumed that one pixel 100 of the four pixels 100 included in the unit pixel 110 is exposed for first exposure time by the exposure (1), two pixels 100 are exposed for second exposure time shorter than the first exposure time by the exposure (2), and the remaining one pixel 100 is exposed for third exposure time shorter than the second exposure time by the exposure (N). Hereinafter, reading from each of the pixels 100 for the first exposure time is referred to as long accumulation, reading for the second exposure time is referred to as intermediate accumulation, and reading for the third exposure time is referred to as short accumulation. Low luminance region pixel data is generated by the long accumulation, intermediate luminance region pixel data is generated by the intermediate accumulation, and long luminance region pixel data is generated by the short accumulation.

With reference to FIG. 4, for example, when a unit pixel 110 including four pixels 100G in an upper left is an example, the upper left can be the pixel 100G of the short accumulation, the upper right and lower left can be the pixels 100G of the intermediate accumulation, and the lower right can be the pixel 100G of the long accumulation.

Figure 17A:
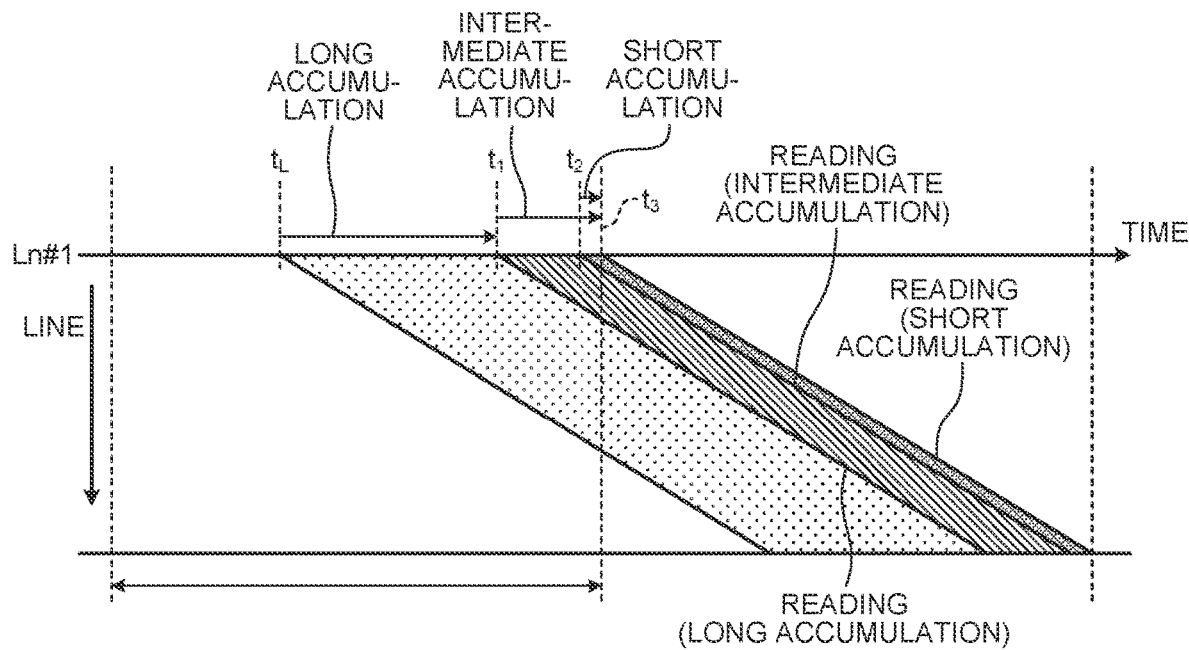
FIG. 17A is a schematic diagram for describing a first example of wide dynamic range imaging applicable to the third embodiment.
Figure 17B:
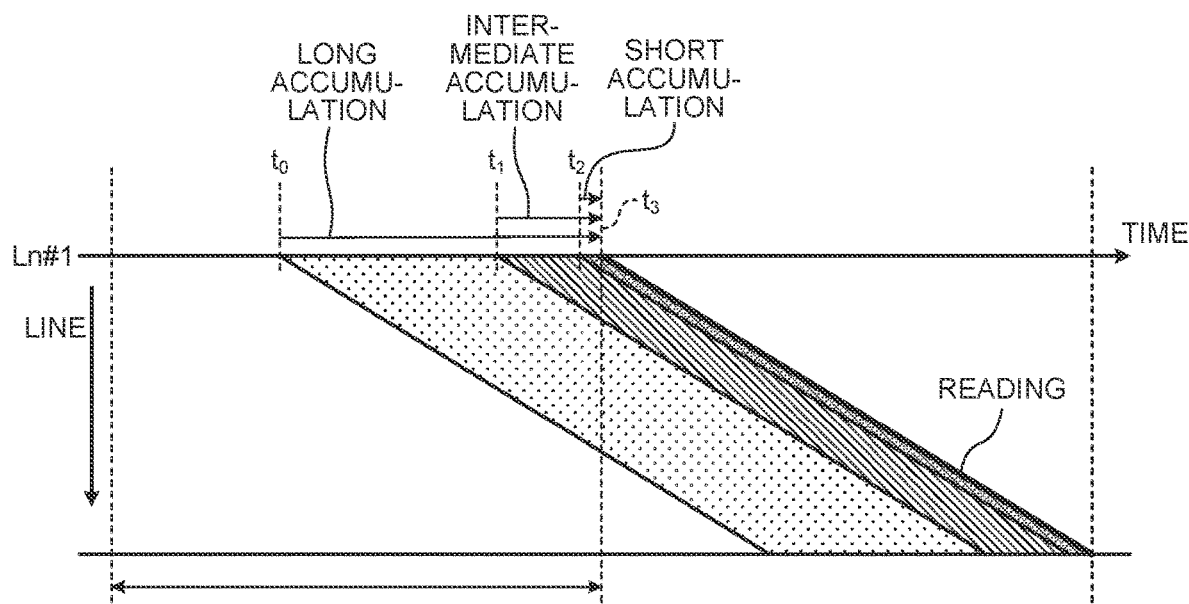
FIG. 17B is a schematic diagram for describing a second example of the wide dynamic range imaging applicable to the third embodiment.

FIG. 17A is a schematic diagram for describing a first example of wide dynamic range imaging applicable to the third embodiment. In FIG. 17A and FIG. 17B (described later), the elapse of time is illustrated in a right direction. In addition, a line is illustrated in a vertical direction, a line at an upper end of a frame is set as a line Ln #1, and reading is sequentially performed from the line Ln #1 toward a lower end side of the frame (rolling shutter method).

In a first example of wide dynamic range imaging, exposures of the long accumulation, the intermediate accumulation, and the short accumulation are executed in parallel, and reading from each of the pixels of the long accumulation, the intermediate accumulation, and the short accumulation is simultaneously executed.

For example, in the line Ln #1, the exposure (1) by the long accumulation is started at time $t_0$ in one frame time, and the exposure (2) by the intermediate accumulation is started at time $t_1$ at which predetermined time elapses from the time $t_0$. The exposure (N) by the short accumulation is started at time $t_2$ at which the predetermined time further elapses from the time $t_1$. At time $t_3$ after an elapse of the predetermined time from the time $t_2$, the exposure by each of the long accumulation, the intermediate accumulation, and the short accumulation is ended, and reading from each of the pixels of the long accumulation, the intermediate accumulation, and the short accumulation is performed.

FIG. 17B is a schematic diagram for describing a second example of the wide dynamic range imaging applicable to the third embodiment. In the second example of the wide dynamic range imaging, exposures of the long accumulation, the intermediate accumulation, and the short accumulation are sequentially executed, and reading from a pixel is executed for each of the exposures.

For example, in a line Ln #1, the exposure (1) by the long accumulation is started at time $t_0$ in one frame time, the exposure (1) by the long accumulation is ended at time $t_1$ at which the predetermined time elapses from the time $t_0$, and reading is performed from a pixel of the long accumulation. Subsequently, the exposure (2) by the intermediate accumulation is started at the time $t_1$, the exposure (2) by the intermediate accumulation is ended at time $t_2$ at which the predetermined time elapses from the time $t_1$, and reading is performed from a pixel of the intermediate accumulation. Furthermore, the exposure (N) by the short accumulation is started at the time $t_2$, the exposure (N) by the short accumulation is ended at time $t_3$ at which the predetermined time elapses from the time $t_2$, and reading is performed from a pixel of the short accumulation. That is, in the second example of the HDR imaging, in each line, the exposure is performed three times that are the long accumulation, the intermediate accumulation, and the short accumulation within the one frame time.

Here, the exposure control unit 101a can perform the exposure by the exposure (V) in a frame different from that of the above-described exposures by the other exposures (1) to (N). For example, the exposure control unit 101a can alternately execute the exposure by the exposure (V) and the exposures by the other exposures (1) to (N). Furthermore, the exposure control unit 101a may execute the exposures (1), (2), . . . , and (N) in different frames.

Also in the third embodiment, effects similar to the effects in the first embodiment described above can be acquired.

Furthermore, in the above description, the amounts of exposure time of the pixels 100 included in the unit pixel 110 are varied, whereby the low luminance region pixel data, the intermediate luminance region pixel data, and the high luminance region image data are generated. However, this example is not a limitation. For example, with reference to FIG. 8, it is also conceivable to provide a plurality of amplifiers to adjust signal levels of a pixel signal output from the exposure control unit 101, and to vary gains of the plurality of amplifiers. The AD conversion is performed on each of the pixel signals respectively output from the plurality of amplifiers and high luminance region pixel data, intermediate luminance region pixel data, and low luminance region pixel data are generated. In this case, the AD conversion is performed on the pixel signals respectively output from the amplifier having the lowest gain, the amplifier having intermediate gain, and the amplifier having the highest gain, and the high luminance region pixel data, the intermediate luminance region pixel data, and the low luminance region pixel data are respectively generated.

6. Fourth Embodiment of the Present Disclosure

Figure 18:
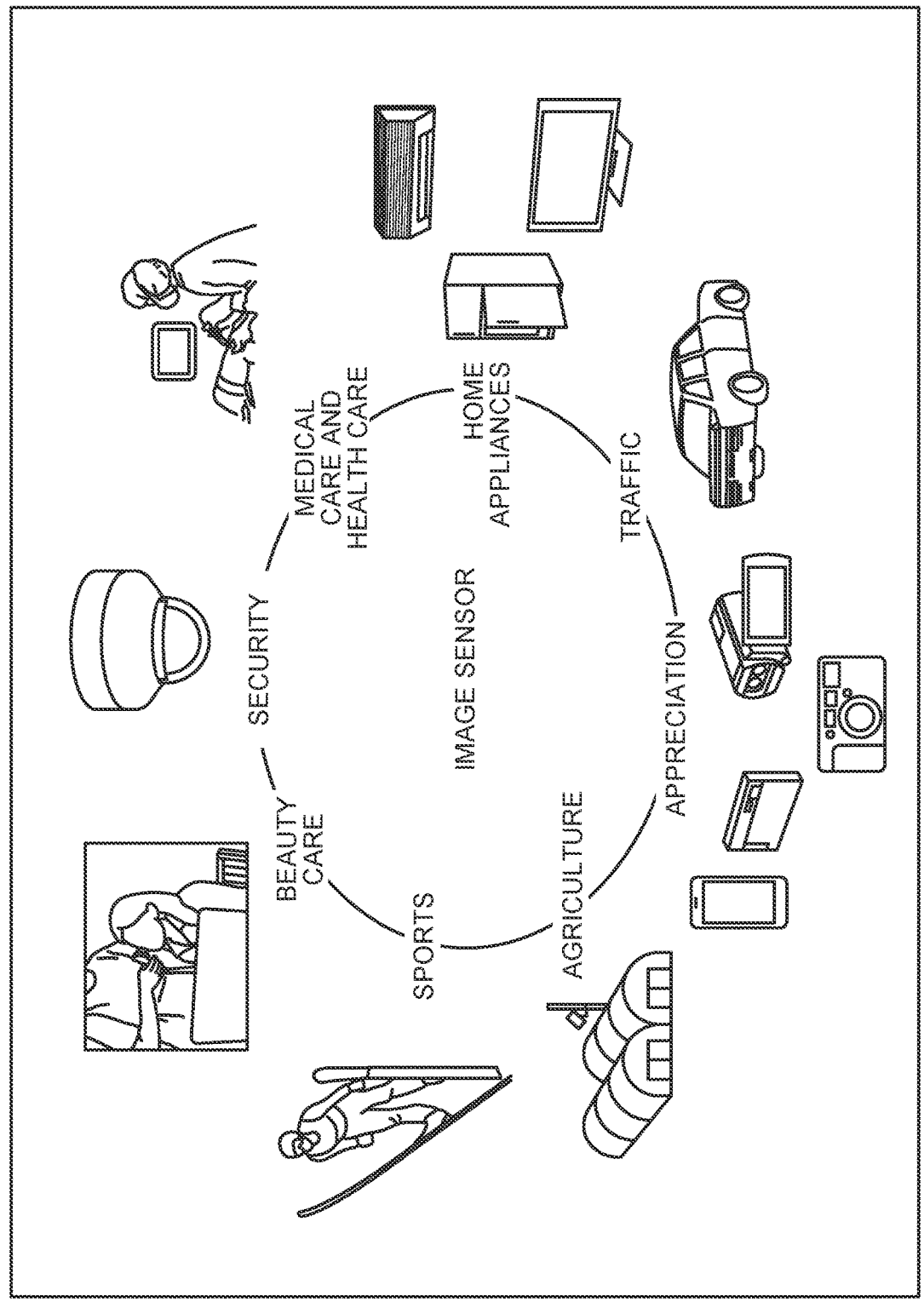
FIG. 18 is a view for describing a usage example of an imaging device to which a disclosed technology is applied.

Next, as a fourth embodiment, application examples of the imaging device according to the first embodiment, the second embodiment, and the third embodiment according to the present disclosure will be described. FIG. 18 is a view illustrating examples of use of the imaging device 1 according to the first embodiment, the second embodiment, and the third embodiment described above.

The above-described imaging device 1 can be used, for example, in various cases of sensing light such as visible light, infrared light, ultraviolet light, and X-rays as described below.

- A device that captures an image to be used for appreciation, such as a digital camera or a portable device with a camera function.
- A device used for traffic, such as an in-vehicle sensor that captures images of the front, rear, surroundings, inside, and the like of an automobile for safe driving such as automatic stop, recognition of a condition of a driver, and the like, a monitoring camera that monitors traveling vehicles and roads, and a distance measuring sensor that measures a distance between vehicles and the like.
- A device used for home appliances such as a TV, a refrigerator, and an air conditioner in order to capture an image of a gesture of a user and operate a device according to the gesture.
- A device used for medical care or health care, such as an endoscope or a device that performs angiography by receiving infrared light.
- A device used for security, such as a monitoring camera for crime prevention or a camera for person authentication.
- A device used for beauty care, such as a skin measuring instrument that photographs skin or a microscope that photographs a scalp.
- A device used for sports, such as an action camera or a wearable camera for sports or the like.
- A device used for agriculture, such as a camera to monitor conditions of fields and crops.

Note that the effects described in the present description are merely examples and are not limitations, and there may be a different effect.

Note that the present technology can also have the following configurations.

(1) An imaging element comprising:
    an imaging unit including a unit pixel that outputs a pixel signal corresponding to received light; and
    a generation unit that generates, on a basis of the pixel signal, a processing pixel signal corresponding to each of a plurality of luminance regions having continuous luminance.

(2) The imaging element according to the above (1), wherein
    the imaging unit
    outputs the pixel signal to the generation unit and an image processing unit that generates an image signal for display on a basis of the pixel signal.

(3) The imaging element according to the above (1) or (2), wherein
the generation unit
outputs the processing pixel signal to a signal processing unit that performs signal processing on the processing pixel signal.
(4) The imaging element according to the above (3), wherein
the generation unit
generates a split pixel signal, which is acquired by a split of the pixel signal according to each of the plurality of luminance regions, according to each of the plurality of luminance regions.
(5) The imaging element according to the above (4), wherein
the generation unit
generates split pixel data by splitting pixel data, which is based on the pixel signal, at bit positions respectively corresponding to the plurality of luminance regions.
(6) The imaging element according to the above (5), wherein
the generation unit
generates the split pixel data by splitting the pixel data at one or more of the bit positions for every predetermined number of bits from a most significant bit to a least significant bit.
(7) The imaging element according to the above (6), wherein
the generation unit
adds a dummy bit to the split pixel data in a case where a number of bits of the split pixel data corresponding to a luminance region including the least significant bit among the plurality of luminance regions is smaller than the predetermined number of bits.
(8) The imaging element according to the above (6) or (7), wherein
the generation unit
splits the pixel data at every predetermined number of bits based on a bit width that can be supported by the signal processing unit.
(9) The imaging element according to any one of the above (3) to (7), wherein
the unit pixel includes a first pixel, and a second pixel having lower sensitivity to light than the first pixel, and
the imaging unit
adds up a first pixel signal of the first pixel and a second pixel signal of the second pixel, and performs an output thereof as the pixel signal.
(10) The imaging element according to the above (3), wherein
the generation unit
generates pixel data for each of the plurality of luminance regions on a basis of the pixel signal.
(11) The imaging element according to the above (3), wherein
the unit pixel includes a plurality of pixels,
the imaging unit
exposes at least two of the plurality of pixels included in the unit pixel for different amounts of exposure time within one frame period, and outputs a plurality of pixel signals respectively corresponding to the amounts of the exposure time, and
the generation unit
outputs a first pixel signal of a luminance region from maximum luminance to predetermined luminance among the plurality of luminance regions of a pixel signal exposed for shortest exposure time in the different amounts of the exposure time among the plurality of pixel signals, and
outputs a second pixel signal of a predetermined luminance region in which luminance is continuous with the predetermined luminance in a luminance region from the predetermined luminance to minimum luminance among the plurality of luminance regions of at least one pixel signal having the exposure time longer than that of the first pixel signal among the plurality of pixel signals.
(12) The imaging element according to any one of the above (3) to (11), wherein
the signal processing unit
performs, as the signal processing, recognition processing based on the pixel signal by using a neural network, and
the generation unit
supplies each of the processing pixel signals respectively corresponding to the plurality of luminance regions to the signal processing unit.
(13) The imaging element according to any one of the above (3) to (12), further comprising
the signal processing unit.
(14) An imaging method comprising:
an imaging step of having a unit pixel that outputs a pixel signal corresponding to received light; and
a generating step of generating, on a basis of the pixel signal, a processing pixel signal corresponding to each of a plurality of luminance regions having continuous luminance,
the steps being executed by a processor.
(15) An imaging device comprising:
an imaging unit including a unit pixel that outputs a pixel signal corresponding to received light;
an optical unit that guides light from a subject to the imaging unit;
a generation unit that generates, on a basis of the pixel signal, a processing pixel signal corresponding to each of a plurality of luminance regions having continuous luminance;
a signal processing unit that executes signal processing on the processing pixel signal generated by the generation unit; and
a recording unit that records image data based on the pixel signal.

REFERENCE SIGNS LIST

1 IMAGING DEVICE
10 IMAGING ELEMENT
30, $31_1$, $31_2$, $31_N$ PIXEL DATA
$32_1$, $32_2$, $32_N$ IMAGE DATA
33 PACKING DATA
40 HIGH LUMINANCE REGION IMAGE DATA
41 INTERMEDIATE LUMINANCE REGION IMAGE DATA
42 LOW LUMINANCE REGION IMAGE DATA
100, 100B, 100G, 100R PIXEL
101, 101a EXPOSURE CONTROL UNIT
102, 102a, 102a', 102b, 102c, 140 SIGNAL PROCESSING IMAGE GENERATION UNIT
103, 151 SIGNAL PROCESSING UNIT
104 IMAGE PROCESSING UNIT
105, $105a_1$, $105a_2$, $105a_N$, 105v AD CONVERSION UNIT

110 UNIT PIXEL
130 PIXEL ARRAY UNIT
1021 BIT SPLIT UNIT
1022, 1025 DUMMY ADDING UNIT
1023, 1024 BUFFER MEMORY

The invention claimed is:

1. An imaging element comprising:
an imaging unit including a unit pixel that outputs a pixel signal corresponding to received light; and
at least one processor configured to
generate, on a basis of the pixel signal, a processing pixel signal corresponding to each of a plurality of luminance regions having continuous luminance,
generate a split pixel signal, which is acquired by a split of the pixel signal according to each of the plurality of luminance regions, according to each of the plurality of luminance regions,
generate split pixel data by splitting pixel data, which is based on the pixel signal, at one or more of bit positions for every predetermined number of bits from a most significant bit to a least significant bit, and
add a dummy bit to the split pixel data in a case where a number of bits of the split pixel data corresponding to a luminance region including the least significant bit among the plurality of luminance regions is smaller than the predetermined number of bits.

2. The imaging element according to claim 1, wherein the imaging unit outputs the pixel signal to the at least one processor for generation of an image signal for display on a basis of the pixel signal.

3. The imaging element according to claim 1, wherein the at least one processor is configured to generate the processing pixel signal for performance of a signal processing on the processing pixel signal.

4. The imaging element according to claim 3, wherein the at least one processor is configured to generate the pixel data for each of the plurality of luminance regions on a basis of the pixel signal.

5. The imaging element according to claim 3, wherein
the unit pixel includes a plurality of pixels, the imaging unit exposes at least two of the plurality of pixels included in the unit pixel for different amounts of exposure time within one frame period, and outputs a plurality of pixel signals respectively corresponding to amounts of the exposure time, and
the at least one processor is configured to output a first pixel signal of a luminance region from maximum luminance to predetermined luminance among the plurality of luminance regions of a pixel signal exposed for shortest exposure time in the different amounts of the exposure time among the plurality of pixel signals, and to output a second pixel signal of a predetermined luminance region in which luminance is continuous with the predetermined luminance in a luminance region from the predetermined luminance to minimum luminance among the plurality of luminance regions of at least one pixel signal having the exposure time longer than that of the first pixel signal among the plurality of pixel signals.

6. The imaging element according to claim 3, wherein the at least one processor is configured to
performs, as the signal processing, recognition processing based on the pixel signal by using a neural network, and supply each of the processing pixel signals respectively corresponding to the plurality of luminance regions for the signal processing.

7. The imaging element according to claim 1, wherein the unit pixel includes a first pixel, and a second pixel having lower sensitivity to light than the first pixel, and the imaging unit adds up a first pixel signal of the first pixel and a second pixel signal of the second pixel, and performs an output thereof as the pixel signal.

8. An imaging method comprising:
receiving, from an output of an imaging unit including a unit pixel, a pixel signal corresponding to received light;
generating, on a basis of the pixel signal, a processing pixel signal corresponding to each of a plurality of luminance regions having continuous luminance;
generating a split pixel signal, which is acquired by a split of the pixel signal according to each of the plurality of luminance regions, according to each of the plurality of luminance regions;
generating split pixel data by splitting pixel data, which is based on the pixel signal, at one or more of bit positions for every predetermined number of bits from a most significant bit to a least significant bit; and
adding a dummy bit to the split pixel data in a case where a number of bits of the split pixel data corresponding to a luminance region including the least significant bit among the plurality of luminance regions is smaller than the predetermined number of bits.

9. An imaging device comprising the imaging element according to claim 1.

10. A non-transitory computer readable medium storing a program for performing imaging, the program being executable by a processor to perform operations comprising:
receiving, from an output of an imaging unit including a unit pixel, a pixel signal corresponding to received light;
generating, on a basis of the pixel signal, a processing pixel signal corresponding to each of a plurality of luminance regions having continuous luminance;
generating a split pixel signal, which is acquired by a split of the pixel signal according to each of the plurality of luminance regions, according to each of the plurality of luminance regions;
generating split pixel data by splitting pixel data, which is based on the pixel signal, at one or more of bit positions for every predetermined number of bits from a most significant bit to a least significant bit; and
adding a dummy bit to the split pixel data in a case where a number of bits of the split pixel data corresponding to a luminance region including the least significant bit among the plurality of luminance regions is smaller than the predetermined number of bits.

11. The non-transitory computer readable medium according to claim 10, wherein the pixel signal is output for display on a basis of the pixel signal.

12. The non-transitory computer readable medium according to claim 10, wherein the operations further comprise:
generating the processing pixel signal for performance of a signal processing on the processing pixel signal.

13. The non-transitory computer readable medium according to claim 12, wherein the operations further comprise:
generating the pixel data for each of the plurality of luminance regions on a basis of the pixel signal.

14. The non-transitory computer readable medium according to claim 12, wherein
the unit pixel includes a plurality of pixels, the imaging unit exposes at least two of the plurality of pixels included in the unit pixel for different amounts of exposure time within one frame period, and outputs a plurality of pixel signals respectively corresponding to amounts of the exposure time, and the operations further comprise outputting a first pixel signal of a luminance region from maximum luminance to predetermined luminance among the plurality of luminance regions of a pixel signal exposed for shortest exposure time in the different amounts of the exposure time among the plurality of pixel signals, and outputting a second pixel signal of a predetermined luminance region in which luminance is continuous with the predetermined luminance in a luminance region from the predetermined luminance to minimum luminance among the plurality of luminance regions of at least one pixel signal having the exposure time longer than that of the first pixel signal among the plurality of pixel signals.

15. The non-transitory computer readable medium according to claim 12, wherein the operations further comprise:

performing, as the signal processing, recognition processing based on the pixel signal by using a neural network; and supplying each of the processing pixel signals respectively corresponding to the plurality of luminance regions for the signal processing.

16. The non-transitory computer readable medium according to claim 10, wherein the unit pixel includes a first pixel, and a second pixel having lower sensitivity to light than the first pixel, and the imaging unit adds up a first pixel signal of the first pixel and a second pixel signal of the second pixel, and performs an output thereof as the pixel signal.

* * * * *